(12) United States Patent
Sasakawa et al.

(10) Patent No.: US 11,888,121 B2
(45) Date of Patent: Jan. 30, 2024

(54) SECONDARY BATTERY, BATTERY PACK, AND VEHICLE

(71) Applicant: KABUSHIKI KAISHA TOSHIBA, Tokyo (JP)

(72) Inventors: Tetsuya Sasakawa, Yokohama (JP); Tomoe Kusama, Tokyo (JP); Tomoko Sugizaki, Kawasaki (JP); Kazuomi Yoshima, Yokohama (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 124 days.

(21) Appl. No.: 17/462,410

(22) Filed: Aug. 31, 2021

(65) Prior Publication Data

US 2022/0302502 A1    Sep. 22, 2022

(30) Foreign Application Priority Data

Mar. 22, 2021    (JP) ................................ 2021-047196

(51) Int. Cl.
*H01M 10/0569*    (2010.01)
*H01M 4/485*    (2010.01)
*H01M 10/42*    (2006.01)
*H01M 4/58*    (2010.01)
*H01M 10/056*    (2010.01)
(Continued)

(52) U.S. Cl.
CPC ....... *H01M 10/0569* (2013.01); *H01M 4/485* (2013.01); *H01M 4/5825* (2013.01); *H01M 10/056* (2013.01); *H01M 10/425* (2013.01); *H01M 50/414* (2021.01); *H01M 50/434* (2021.01); *H01M 50/44* (2021.01); *H01M 50/46* (2021.01); *H01M 2220/20* (2013.01);
(Continued)

(58) Field of Classification Search
CPC ........... H01M 50/414; H01M 50/4295; H01M 50/434; H01M 50/44; H01M 50/443; H01M 50/451; H01M 50/46
See application file for complete search history.

(56) References Cited

U.S. PATENT DOCUMENTS

2017/0346062 A1* 11/2017 Wong .................. H01M 50/417
2019/0006664 A1    1/2019 Kano et al.
(Continued)

FOREIGN PATENT DOCUMENTS

| JP | 2019-9112 A | 1/2019 |
|---|---|---|
| JP | 2019-140054 A | 8/2019 |
| JP | 2019-145264 A | 8/2019 |

*Primary Examiner* — Scott J. Chmielecki
(74) *Attorney, Agent, or Firm* — Oblon, McClelland, Maier & Neustadt, L.L.P.

(57) ABSTRACT

According to one embodiment, a secondary battery includes a positive electrode, a negative electrode, a separator layer, and a nonaqueous electrolytic solution. The separator layer includes a first porous layer containing a solid electrolyte and a second porous layer containing fibers. The second porous layer is in contact with a first surface of the first porous layer. The nonaqueous electrolytic solution includes a first solvent including at least one of methyl propionate and ethyl propionate, and a second solvent different from the first solvent. The first porous layer has a void fraction of 10% by volume or greater and 50% by volume or less. The second porous layer has a void fraction greater than the void fraction of the first porous layer.

30 Claims, 6 Drawing Sheets

(51) Int. Cl.
  *H01M 50/414* (2021.01)
  *H01M 50/434* (2021.01)
  *H01M 50/44* (2021.01)
  *H01M 50/46* (2021.01)

(52) U.S. Cl.
  CPC .............. *H01M 2300/0037* (2013.01); *H01M 2300/0051* (2013.01)

(56) References Cited

U.S. PATENT DOCUMENTS

| | | | |
|---|---|---|---|
| 2019/0140236 A1* | 5/2019 | Sun | H01M 10/052 |
| 2019/0198837 A1* | 6/2019 | Yushin | H01M 50/446 |
| 2019/0260075 A1 | 8/2019 | Yoshima et al. | |
| 2019/0260085 A1* | 8/2019 | Hagiwara | H01M 4/525 |
| 2019/0296306 A1* | 9/2019 | Sugizaki | H01M 50/46 |
| 2019/0372154 A1* | 12/2019 | Yamamoto | H01M 10/06 |
| 2019/0393465 A1* | 12/2019 | Yoshida | H01M 50/431 |
| 2020/0035998 A1* | 1/2020 | Lu | H01M 4/1315 |
| 2020/0058923 A1* | 2/2020 | Minami | H01M 10/0566 |
| 2021/0194054 A1* | 6/2021 | Dai | H01M 10/0525 |
| 2021/0218015 A1* | 7/2021 | Chen | H01M 4/0404 |
| 2021/0234153 A1* | 7/2021 | Xiao | H01M 4/366 |
| 2021/0234198 A1* | 7/2021 | He | H01M 10/0568 |
| 2021/0257656 A1* | 8/2021 | Yersak | H01M 10/056 |
| 2022/0006117 A1* | 1/2022 | Takahashi | H01M 10/0562 |
| 2022/0085456 A1* | 3/2022 | Kusama | H01M 4/62 |

* cited by examiner

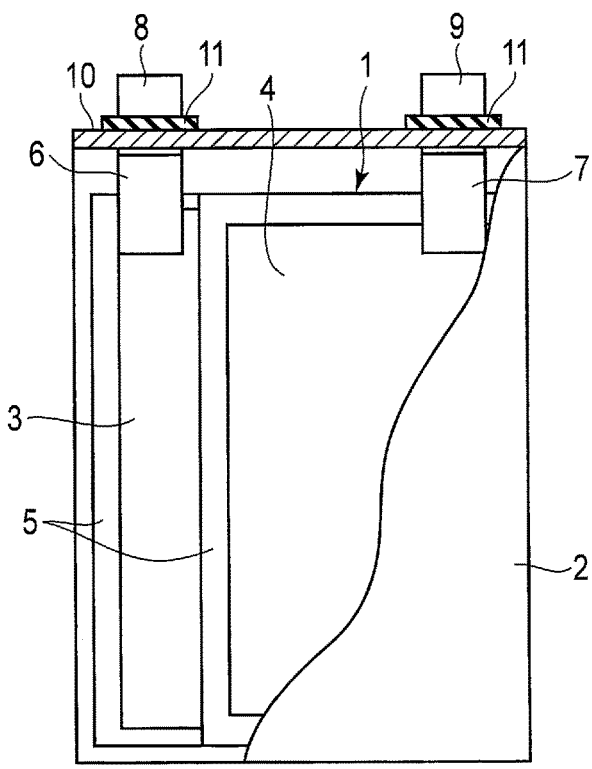
F I G. 3
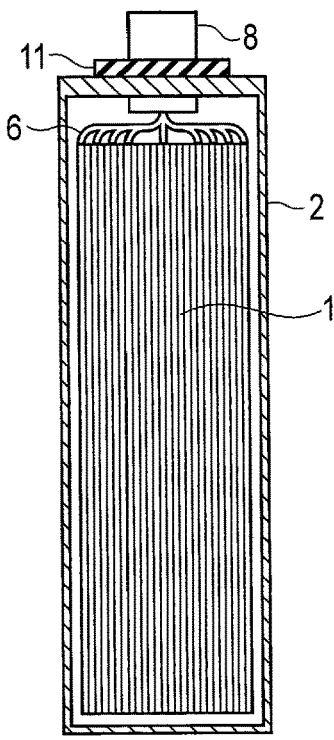
F I G. 4

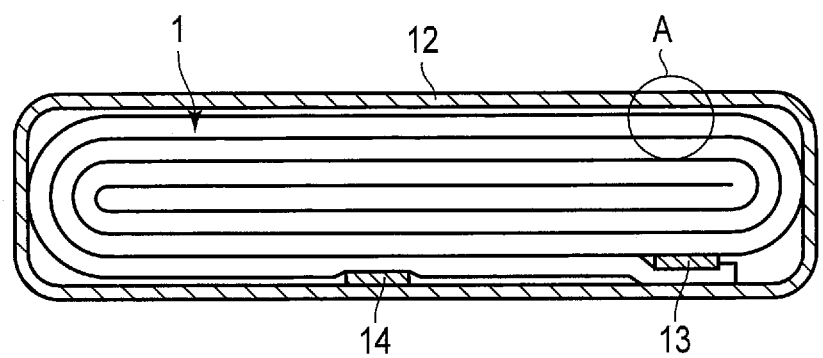
F I G. 5
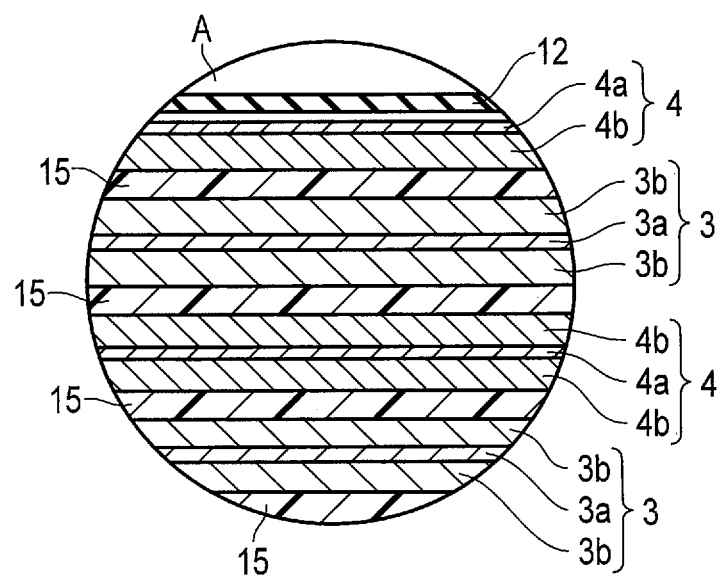
F I G. 6

SECONDARY BATTERY, BATTERY PACK, AND VEHICLE

CROSS-REFERENCE TO RELATED APPLICATIONS

This application is based upon and claims the benefit of priority from Japanese Patent Application No. 2021-047196, filed Mar. 22, 2021, the entire contents of which are incorporated herein by reference.

FIELD

Embodiments described herein generally relate to a secondary battery, a battery pack, and a vehicle.

BACKGROUND

It is known that applying solid electrolyte particles to a separator of a secondary battery allows high output of the secondary battery. In a secondary battery provided with a separator containing solid electrolyte particles, there is a trade-off between output performance and self-discharge performance in which, if one improves, the other deteriorates, making it difficult to achieve both.

BRIEF DESCRIPTION OF THE DRAWINGS

FIG. 3 is a partially cut-out cross-sectional view of the secondary battery according to the embodiment;

FIG. 4 is a side view of the battery shown in FIG. 3;

FIG. 5 is a cross-sectional view of the secondary battery according to the embodiment cut in a direction perpendicular to a terminal extending direction;

FIG. 6 is an enlarged cross-sectional view of section A shown in FIG. 5;

DETAILED DESCRIPTION

Figure 1:
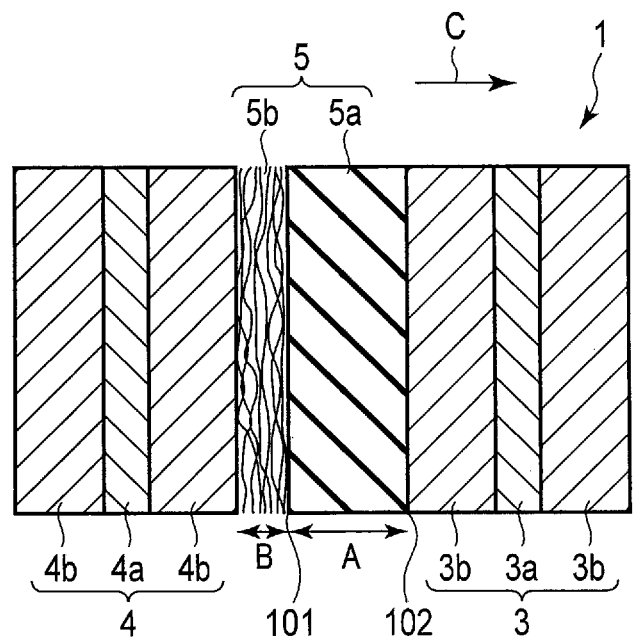
FIG. 1 is a cross-sectional view showing an example of an electrode group of a secondary battery according to an embodiment.

According to one embodiment, a secondary battery including a positive electrode, a negative electrode, a separator layer, and a nonaqueous electrolytic solution is provided. The separator layer is positioned between the positive electrode and the negative electrode, and includes a first porous layer containing a solid electrolyte and a second porous layer containing fibers. The second porous layer is in contact with a first surface of the first porous layer. The nonaqueous electrolytic solution includes a first solvent including at least one of methyl propionate and ethyl propionate, and a second solvent different from the first solvent. The first porous layer has a void fraction of 10% by volume or greater and 50% by volume or less. The second porous layer has a void fraction greater than the void fraction of the first porous layer.

According to another embodiment, a battery pack including the secondary battery according to the embodiment is provided.

According to another embodiment, a vehicle including the battery pack according to the embodiment is provided.

First Embodiment

As a result of conducting intensive research, the present inventors have found that when a nonaqueous electrolytic solution containing a solvent including cyclic carbonates and linear carbonates is held on a separator containing a solid electrolyte, components that inhibit movement of Li ions such as anions and cyclic carbonates in the electrolytic solution are attracted to the solid electrolyte and a transport number of Li ions increases, but specified kinds of linear carbonates in the electrolytic solution (e.g., diethyl carbonate (DEC), methyl ethyl carbonate (MEC), etc.) are not attracted to the solid electrolyte and become resistance components.

The present inventors have found for the first time that when a secondary battery is prepared in the following manner, output performance can improve while self-discharge of the secondary battery is suppressed. In a secondary battery including a positive electrode, a negative electrode, a separator layer between the positive electrode and the negative electrode, and a nonaqueous electrolytic solution, the separator layer includes a first porous layer containing a solid electrolyte and a second porous layer in contact with the first porous layer and containing fibers, the nonaqueous electrolytic solution includes at least one of methyl propionate and ethyl propionate, the first porous layer has a void fraction of from 10% by volume to 50% by volume, and the second porous layer has a void fraction greater than that of the first porous layer.

The reason for setting the void fraction of the first porous layer containing the solid electrolyte to the above-described range will be described. When the void fraction of the first porous layer is 50% by volume or less, the solid electrolyte is densely filled, and a flow path of the electrolytic solution becomes narrow. While this may result in an increase in the resistance, the solid electrolyte surface area increases, which enhances a force of the solid electrolyte attracting components inhibiting movement of Li ions. Therefore, the resistance of the secondary battery can be reduced. However, when the void fraction of the first porous layer is less than 10% by volume, the resistance significantly increases due to the flow path of the electrolytic solution becoming narrow. Therefore, when the void fraction of the first porous layer is from 10% by volume to 50% by volume, a force of the solid electrolyte attracting components inhibiting movement of Li ions in the electrolytic solution can be obtained while the resistance increase resulting from the flow path of the electrolytic solution is suppressed; therefore, output performance of the secondary battery can improve. The preferable range of the void fraction of the first porous layer is from 10% by volume to 40% by volume, and the more preferred range is from 20% by volume to 40% by volume.

Methyl propionate and ethyl propionate are each strongly attracted to the solid electrolyte as compared to other linear carbonates such as DEC and MEC. Thus, the combination with the above-described first porous layer makes it possible to promote attraction of components inhibiting movement of Li ions in the electrolytic solution to the solid electrolyte, and it is therefore possible to increase a transport number of Li ions and to promote low resistance.

When the second porous layer has a void fraction greater than that of the first porous layer, the retention amount of the nonaqueous electrolytic solution of the second porous layer can be increased. When the second porous layer is in contact with the first surface of the first porous layer, a supply of the electrolytic solution to the first porous layer is promoted, and insulation properties are ensured by the first porous layer and the second porous layer, making it possible to suppress self-discharge.

Therefore, according to the secondary battery of the embodiment, output performance can improve while self-discharge is suppressed.

The secondary battery according to the embodiment includes a positive electrode, a negative electrode, a first porous layer, a second porous layer, and a nonaqueous electrolytic solution, and may also include a container member other than the above. Each structure will be described below.

1) Positive Electrode

The positive electrode may include a positive electrode current collector and a positive electrode active material-containing layer. The positive electrode active material-containing layer may be formed on one or both reverse surfaces of the positive electrode current collector. The positive electrode active material-containing layer includes a positive electrode active material, and may optionally include an electro-conductive agent and a binder.

As the positive electrode active material, for example, an oxide or a sulfide may be used. The positive electrode may singly include one kind of compound as the positive electrode active material, or alternatively, include two or more kinds of compounds in combination. Examples of the oxide and sulfide include compounds capable of having Li and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\le1$), lithium nickel composite oxides (e.g., $Li_xNiO_2$; $0<x\le1$), lithium cobalt composite oxides (e.g., $Li_xCoO_2$; $0<x\le1$), lithium nickel cobalt composite oxides (e.g., $Li_xNi_{1-y}Co_yO_2$; $0<x\le1$, $0<y<1$), lithium manganese cobalt composite oxides (e.g., $Li_xMn_yCo_{1-y}O_2$; $0<x\le1$, $0<y<1$), lithium manganese nickel composite oxides having a spinel structure (e.g., $Li_xMn_{2-y}Ni_yO_4$; $0<x\le1$, $0<y<2$), lithium phosphates having an olivine structure (e.g., $Li_xFePO_4$; $0<x<1$, $Li_xFe_{1-y}Mn_yPO_4$; $0<x\le1$, $0<y<1$, $Li_xCoPO_4$; $0<x<1$), iron sulfates ($Fe_2(SO_4)_3$), vanadium oxides (e.g., $V_2O_5$), and lithium nickel cobalt manganese composite oxides ($Li_xNi_{1-y-z}Co_yMn_zO_2$; $0<x<1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\le1$), lithium nickel composite oxides (e.g., $Li_xNiO_2$; $0<x\le1$), lithium cobalt composite oxides (e.g., $Li_xCoO_2$; $0<x\le1$), lithium nickel cobalt composite oxides (e.g., $Li_xNi_{1-y}Co_yO_2$; $0<x\le1$, $0<y<1$), lithium manganese nickel composite oxides having a spinel structure (e.g., $Li_xMn_{2-y}Ni_yO_4$; $0<x\le1$, $0<y<2$), lithium manganese cobalt composite oxides (e.g., $Li_xMn_yCo_{1-y}O_2$; $0<x<1$, $0<y<1$), lithium iron phosphates (e.g., $Li_xFe_2O_4$; $0<x\le1$), and lithium nickel cobalt manganese composite oxides ($Li_xNi_{1-y-z}Co_yMn_zO_2$; $0<x<1$, $0<y<1$, $0<z<1$, $y+z<1$). The positive electrode potential can be made high by using these positive electrode active materials.

The lithium nickel cobalt manganese composite oxide and the lithium manganese composite oxides having a spinel structure contribute to an improvement in output performance.

The primary particle diameter of the positive electrode active material is preferably from 100 nm to 1 μm. The positive electrode active material having a primary particle size of 100 nm or more is easy to handle during industrial production. In the positive electrode active material having a primary particle size of 1 μm or less, in-solid diffusion of lithium ions can proceed smoothly.

The specific surface area of the positive electrode active material is preferably from 0.1 $m^2$/g to 10 $m^2$/g. The positive electrode active material having a specific surface area of 0.1 $m^2$/g or more can secure sufficient sites for inserting and extracting Li ions. The positive electrode active material having a specific surface area of 10 $m^2$/g or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoro ethylene (PTFE), polyvinylidene fluoride (PVdF), fluorine rubber, polyacrylic acid compounds, imide compounds, carboxymethyl cellulose (CMC), and salts of the CMC. One of these may be used as the binder, or alternatively, two or more may be used in combination as the binder.

The electro-conductive agent is added to improve current collection performance and to suppress the contact resistance between the positive electrode active material and the positive electrode current collector. Examples of the electro-conductive agent include carbonaceous substances. Examples of the carbonaceous substances include vapor grown carbon fiber (VGCF), carbon black such as acetylene black, and graphite. One of these may be used as the electro-conductive agent, or alternatively, two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. When the amount of the electro-conductive agent is 15% by mass or less, the proportion of the electro-conductive agent that contacts the electrolyte can be made low. When this proportion is low, decomposition of an electrolyte can be reduced during storage under high temperatures.

The positive electrode current collector is preferably an aluminum foil, or an aluminum alloy foil containing one or more elements selected from the group consisting of Mg, Ti, Zn, Ni, Cr, Mn, Fe, Cu, and Si.

The thickness of the aluminum foil or aluminum alloy foil is preferably from 5 μm to 20 μm, and more preferably 15 μm or less. The purity of the aluminum foil is preferably 99% by mass or more. The amount of transition metals such as iron, copper, nickel, or chromium contained in the aluminum foil or aluminum alloy foil is preferably 1% by mass or less.

The positive electrode current collector may include a portion where a positive electrode active material-containing layer is not formed on a surface thereof. This portion may serve as a positive electrode current collecting tab.

In the positive electrode, for example, a positive electrode active material, an electro-conductive agent, and a binder are suspended in a solvent to prepare a slurry. This slurry is applied onto one or both surfaces of a current collector. Next, the applied slurry is dried to form a stack of active material-containing layer(s) and a current collector. Then, the stack is subjected to pressing. The positive electrode can be produced in this manner. Alternatively, the positive electrode may also be produced by the following method. First, an active material, an electro-conductive agent, and a binder are mixed to obtain a mixture. Next, the mixture is formed into pellets. Then the positive electrode can be obtained by arranging the pellets on the current collector.

2) Negative Electrode

The negative electrode may include a current collector and an active material-containing layer. The active material-containing layer may be formed on one or both surfaces of the current collector. The active material-containing layer includes a negative electrode active material, and may optionally include an electro-conductive agent and a binder.

Examples of the negative electrode active material include lithium titanate having a ramsdellite structure (e.g., $Li_{2+y}Ti_2O_7$, $0 \leq y \leq 3$), lithium titanate having a spinel structure (e.g., $Li_{4+x}Ti_5O_{12}$, $0 \leq x \leq 3$), monoclinic titanium dioxide ($TiO_2$), anatase type titanium dioxide, rutile type titanium dioxide, a hollandite titanium composite oxide, an orthorhombic titanium composite oxide, and a monoclinic niobium-titanium composite oxide.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb and K. M(II) is at least one selected from the group consisting of Zr, Sn, V, Nb, Ta, Mo, W, Y, Fe, Co, Cr, Mn, Ni and Al. The respective subscripts in the composition formula are specified as follows: $0 \leq a \leq 6$, $0 \leq b < 2$, $0 \leq c < 6$, $0 \leq d < 6$, and $-0.5 \leq \sigma \leq 0.5$. Specific examples of the orthorhombic titanium-containing composite oxide include $Li_{2+a}Na_2Ti_6O_{14}$ ($0 \leq a \leq 6$).

Examples of the monoclinic niobium-titanium composite oxide include a compound represented by $Li_xTi_{1-y}M1_yNb_{2-z}M2_zO_{7+\delta}$. Here, M1 is at least one selected from the group consisting of Zr, Si, and Sn. M2 is at least one selected from the group consisting of V, Ta, and Bi. The respective subscripts in the composition formula are specified as follows: $0 \leq x \leq 5$, $0 \leq y < 1$, $0 \leq z < 2$, and $-0.3 < \delta \leq 0.3$. Specific examples of the monoclinic niobium-titanium composite oxide include $Li_xNb_2TiO_7$ ($0 \leq x \leq 5$).

Another example of the monoclinic niobium-titanium composite oxide is a compound represented by $Li_xTi_{1-y}M3_{y+z}Nb_{2-z}O_{7-\delta}$. Here, M3 is at least one selected from Mg, Fe, Ni, Co, W, Ta, and Mo. The respective subscripts in the composition formula are specified as follows: $0 \leq x \leq 5$, $0 \leq y < 1$, $0 \leq z < 2$, and $-0.3 \leq \delta \leq 0.3$.

The electro-conductive agent is added to improve current collection performance and to suppress contact resistance between the active material and the current collector. Examples of the electro-conductive agent include carbonaceous substances. Examples of the carbonaceous substances include vapor grown carbon fiber (VGCF), carbon nanotubes, carbon black such as acetylene black, and graphite. One of these may be used as the electro-conductive agent, or two or more may be used in combination as the electro-conductive agent. Alternatively, instead of using an electro-conductive agent, a carbon coating or an electro-conductive inorganic material coating may be applied to the surface of the active material particle.

The binder is added to fill gaps among the dispersed active material and also to bind the active material with the current collector. Examples of the binder include polytetrafluoro ethylene (PTFE), polyvinylidene fluoride (PVdF), fluorine rubber, styrene-butadiene rubber, polyacrylate compounds, imide compounds, carboxymethyl cellulose (CMC), and salts of CMC. One of these may be used as the binder, or alternatively, two or more may be used in combination as the binder.

For the blending proportion of the active material, electro-conductive agent and binder in the active material-containing layer, by way of example, a negative electrode active material, electro-conductive agent and binder are preferably blended in proportions of 68% by mass to 96% by mass, 2% by mass to 30% by mass, and 2% by mass to 30% by mass, respectively. When the amount of electro-conductive agent is 2% by mass or more, the current collection performance of the active material-containing layer can be improved. When the amount of binder is 2% by mass or more, binding between the active material-containing layer and current collector is sufficient, and excellent cycling performance can be expected. On the other hand, an amount of each of the electro-conductive agent and binder is preferably 30% by mass or less, in view of increasing the capacity.

For the current collector, a material which is electrochemically stable at the potential at which lithium (Li) is inserted into and extracted from the active material may be used. Examples of the current collector are copper, nickel, stainless steel, aluminum, or an aluminum alloy including one or more elements selected from the group consisting of Mg, Ti, Zn, Mn, Fe, Cu, and Si. The thickness of the current collector is preferably from 5 μm to 20 μm. The current collector having such a thickness can maintain a balance between the strength and weight reduction of the electrode.

The current collector may include a portion where the negative electrode active material-containing layer is not formed on a surface thereof. This portion may serve as a negative electrode current collecting tab.

The negative electrode may be produced by the following method, for example. First, an active material, an electro-conductive agent, and a binder are suspended in a solvent to prepare a slurry. This slurry is applied onto one or both surfaces of the current collector. Next, the applied slurry is dried to form a stack of active material-containing layer(s) and a current collector. Then, the stack is subjected to pressing. The negative electrode can be produced in this manner. Alternatively, the negative electrode may also be produced by the following method. First, an active material, an electro-conductive agent, and a binder are mixed to obtain a mixture. Next, the mixture is formed into pellets. Then, the negative electrode can be obtained by arranging the pellets on the current collector.

3) First Porous Layer

The first porous layer contains a solid electrolyte. The first porous layer may have a sheet shape (including a rectangular shape, a square, etc.). The first porous layer is in contact with either the positive electrode active material-containing layer or the negative electrode active material-containing layer. It is desirable that the first porous layer cover at least a part, preferably an entirety, of a principal surface of either the positive electrode active material-containing layer or the negative electrode active material-containing layer. It is preferable that the first porous layer be in contact with the positive electrode active material-containing layer, and it is more preferable that the first porous layer be formed directly on the principal surface of the positive electrode active material-containing layer. The first porous layer may be formed on one side surface of side surfaces intersecting the principal surface of the positive electrode active material-containing layer, in addition to the principal surface of the positive electrode active material-containing layer.

As the solid electrolyte, an inorganic solid electrolyte is preferably used. One kind of the solid electrolyte or a mixture of two or more kinds thereof may be used. Examples of the inorganic solid electrolyte include an oxide-based solid electrolyte or a sulfide-based solid electrolyte. As the oxide-based solid electrolyte, a lithium phosphate solid electrolyte having a NASICON-type structure can be used. The NASICON-type lithium phosphate solid electrolyte is represented by the general formula $Li_{1+x}M_2(P_{1-y}M'_yO_4)_3$ (where M and M' are one or two or more selected from the group consisting of Ti, Ge, Sr, Zr, Sn, Si and Al, x is $0 \leq x \leq 0.5$, and y is $0 \leq y \leq 0.2$). Examples of the NASICON-type lithium phosphate solid electrolyte include LATP ($Li_{1+x}Al_xTi_{2-x}(PO_4)_3$ (where x is $0 \leq x \leq 0.5$)), $Li_{1+x}Al_xZr_{2-x}(PO_4)_3$ (where x is $0 \leq x \leq 0.5$), and $Li_{1+x}Al_xGe_{2-x}(PO_4)_3$ (where x is $0 \leq x \leq 0.5$). In particular, among the NASICON-type lithium phosphate solid electrolytes, it is preferable to use LATP as the solid electrolyte. LATP has an excellent water resistance, and if LATP is used as a solid electrolyte, hydrolysis does not easily occur in the battery. At least one of the elements of LATP may be substituted with one or two or more elements selected from the group consisting of Ge, Sr, Zr, Sn and Si, and At least one part may be amorphous.

Further, as the oxide-based solid electrolyte, amorphous LIPON ($Li_{2.9}PO_{3.3}N_{0.46}$) or LLZ ($Li_7La_3Zr_2O_{12}$) having a garnet-type structure may be used. Further, as the oxide-based solid electrolyte, a lithium titanium-containing composite oxide may be used. Examples of the lithium titanium-containing composite oxide used as a solid electrolyte include a lithium titanium oxide having a spinel structure (e.g., the general formula $Li_{4+x}Ti_5O_{12}$ (where x is $-1 \leq x \leq 3$)).

Further, as the solid electrolyte, a sodium-containing solid electrolyte may be used. The sodium-containing solid electrolyte has an excellent sodium ion conductivity. Examples of the sodium-containing solid electrolyte include β-alumina, sodium phosphate sulfide, and sodium phosphate oxide. The sodium-containing solid electrolyte is preferably in the form of glass-ceramic.

The content of the solid electrolyte in the first porous layer preferably falls within the range of 80% by mass to 100% by mass. Even when the first porous layer has a void fraction of from 10% by volume to 50% by volume, if the content of the solid electrolyte is small, there is a possibility that the force of the solid electrolyte attracting the solvent or anions may not be sufficient.

The solid electrolyte may be particulate. The solid electrolyte particles may be single primary particles, secondary particles as aggregates of primary particles, or a mixture including both single primary particles and secondary particles.

An average particle size of the solid electrolyte particles may be from 0.1 μm to 10 μm.

The first porous layer may contain a polymer. The polymer functions as a binder binding solid electrolyte particles. Further, the polymer can gel a nonaqueous electrolytic solution. Examples of the polymer include polyacrylonitrile (PAN), polyethylene oxide (PEO), polyvinylidene fluoride (PVdF), and polymethylmethacrylate. The content of the polymer in the first porous layer is preferably from 1% by mass to 10% by mass. If the content deviates from this range, low-temperature performance or discharge performance may decrease. One or two or more polymers may be used.

The first porous layer is prepared, for example, by the following method. The solid electrolyte particles and the polymer are dispersed into the solvent (e.g., N-methylpyrrolidone (NMP)) to prepare a slurry. The resulting slurry is applied to the surface of the positive electrode or the negative electrode, and is then dried to remove the solvent. In this manner, the first porous layer is formed on the positive electrode or the negative electrode. The application method may be, for example, a microgravure method. The void fraction of the first porous layer can be adjusted, for example, according to mixing amounts of raw materials, particle sizes of solid electrolyte particles, etc.

The thickness of the first porous layer may be, for example, in the range of 1 μm to 10 μm.

The void fraction of the first porous layer is measured from a 3D measurement scanning electron microscopy (3D-SEM) image. The battery is put in a glove box filled with argon gas, and then disassembled therein. From the disassembled battery, an electrode including the first porous layer serving as a measurement target is removed. Details of the method will be described later. The removed first porous layer is washed with an ethyl methyl carbonate solvent, and dried. A sample having a size of about 5 mm×5 mm is cut out from the electrode including the first porous layer. After a tungsten protection film is deposited on the principal surface of the sample on the first porous side, a cross-section in the thickness direction of the first porous layer is cut out with a focused ion beam (FIB), and scanning electron microscope (SEM) observation is performed. Thereafter, cross-section processing with FIB and observation with SEM are repeated, and an SEM observation image is reconstructed three-dimensionally, thereby measuring a void fraction. The FIB processing pitch is approximately 150 nm, and the number of repetitions of the FIB process and SEM observation is 100 times.

4) Second Porous Layer

The second porous layer contains fibers. The second porous layer may be, for example, a woven fabric, a nonwoven fabric, or a porous film. A porous layer obtained by stacking multiple kinds, e.g., a nonwoven fabric and a porous film, may be the second porous layer. The second porous layer may have a sheet shape (including a rectangular shape, a square, etc.). The second porous layer is in contact with either the positive electrode active material-containing layer or the negative electrode active material-containing layer. It is desirable that the second porous layer cover at least a part, preferably an entirety, of a principal surface of either the positive electrode active material-containing layer or the negative electrode active material-containing layer. It is preferable that the second porous layer be in contact with the negative electrode active material-containing layer, and it is more preferable that the second porous layer be formed directly on the principal surface of the negative electrode active material-containing layer. In this case, the second porous layer may be formed on one side surface of side surfaces intersecting the principal surface of the negative electrode active material-containing layer, in addition to the principal surface of the negative electrode active material-containing layer.

The second porous layer has a void fraction greater than the void fraction of the first porous layer. The second porous layer has a void fraction of, for example, from 50% by volume to 80% by volume. This allows the second porous layer to have excellent nonaqueous electrolytic solution retention performance and excellent insulation properties, and an effect of suppressing self-discharge and an effect of improving output performance can both be enhanced.

The nonwoven fabric may be, for example, a nonwoven fabric made of cellulose fiber, or the like.

The porous film may be, for example, a polyolefin porous film, or the like. As a polyolefin, for example, at least one of polyethylene and polypropylene can be used.

The second porous layer includes, for example, a layer having a porous layer structure in which fibers are arranged two-dimensionally or three-dimensionally. Examples of polymer materials constituting fibers include one or two or more selected from the group consisting of aramid, polyamideimide, polyamide, polyolefin, polyether, polyimide, polyketone, polysulfone, cellulose, polyvinyl alcohol (PVA), and polyvinylidene fluoride (PVdF). Examples of the polyolefin include polypropylene (PP) and polyethylene (PE).

The second porous layer is produced, for example, by an electrospinning method. In the electrospinning method, a layer containing fibers is directly formed on a substrate by discharging a raw material solution from a spinning nozzle over a surface of the substrate while applying a voltage to the spinning nozzle using a high voltage generator. The applied voltage is appropriately determined according to a solvent/solute species, boiling point/vapor pressure curve of the solvent, a solution concentration, a temperature, a nozzle shape, a sample-nozzle distance, etc., and for example, a potential difference between the nozzle and the workpiece can be set to be from 0.1 to 100 kV. A feeding rate of the raw material solution is also appropriately determined according to a solution concentration, a solution viscosity, a temperature, a pressure, an applied voltage, a nozzle shape, etc. In the case of a syringe type, for example, the feeding rate can be set to be from about 0.1 to 500 μl/min per nozzle. In the case of a multiple nozzle or slit, the feeding rate may be determined according to an opening area.

As the raw material solution, the solution prepared by dissolving the polymer material in the solvent is used. The concentration of the polymer material in the solvent can be set to be, for example, from about 5 to 60% by mass. The solvent for dissolving the polymer material is not particularly limited, and any solvent such as dimethylacetamide (DMAc), dimethylsulfoxide (DMSO), N,N'-dimethylformamide (DMF), N-methylpyrrolidone (NMP), water, alcohols, etc. can be used. For the polymer material with low solubility, electrospinning is performed while the sheet-shaped polymer material is made to be molten with a laser or the like. In addition, it is also acceptable to mix a high-boiling-point organic solvent and a low-melting-point solvent.

The thickness of the second porous layer may be from 1 μm to 10 μm.

An average fiber diameter of fibers constituting the second porous layer can be from 0.05 μm to 10 μm. When the average fiber diameter is 0.05 μm or greater, sufficient strength can be provided to the second porous layer. Further, when the average fiber diameter is 10 μm or less, a retention amount of the nonaqueous electrolytic solution of the second porous layer can be sufficient. Thus, when the average fiber diameter is from 0.05 μm to 10 μm, the strength of the second porous layer and the retention performance of the nonaqueous electrolytic solution can be excellent. The preferable range of the average fiber diameter is from 0.2 μm to 1 μm.

The void fraction of the second porous layer is measured by mercury porosimetry.

The battery is put in a glove box filled with argon gas, and then disassembled therein. From the disassembled battery, the second porous layer serving as a measurement target is removed. Details of the above method will be described later. The removed second porous layer is washed with an ethyl methyl carbonate solvent, and dried.

Next, multiple samples having a size of about 50 mm×50 mm are cut out from the dried second porous layer. The total weight of the samples cut out is about 1 g. They are taken in a measurement cell, and subjected to measurement under conditions of an initial pressure of 5 kPa (about 0.7 psia, which corresponds to a pore diameter of about 250 μm) and a terminal pressure of about 60 thousand psia (which corresponds to a pore diameter of about 0.003 μm). By this measurement, a pore diameter distribution graph of the second porous layer is obtained, and a void fraction of a porous layer can be obtained.

For example, Autopore 9520, manufactured by Shimadzu Corporation, can be used as the measurement device for mercury porosimetry. It is possible to obtain a void fraction of a porous layer from the pore diameter distribution according to mercury porosimetry.

The principle utilized in analysis by mercury porosimetry is based on the Washburn equation of Formula (A).

$$D = -4\gamma \cos \theta / P \qquad \text{Formula (A)}$$

Herein, P indicates pressure, D indicates pore diameter, $\gamma$ indicates surface tension (480 dyne·cm$^{-1}$) of mercury, and $\theta$ indicates a contact angle between mercury and a pore wall surface, which is 140°. Since $\gamma$ and $\theta$ are constants, the relation between the applied pressure P and the pore diameter D is obtained from Washburn's equation, and the pore diameter and volume distribution can thus be derived by measuring the volume of intruded mercury at that time.

5) Nonaqueous Electrolytic Solution

The nonaqueous electrolytic solution includes, for example, an organic solvent, and an electrolyte salt dissolved in the organic solvent.

The concentration of electrolyte salt is preferably from 0.5 mol/L to 2.5 mol/L.

Examples of the electrolyte salt include lithium salts such as lithium perchlorate (LiClO$_4$), lithium hexafluorophosphate (LiPF$_6$), lithium tetrafluoroborate (LiBF$_4$), lithium hexafluoroarsenate (LiAsF$_6$), lithium trifluoromethanesulfonate (LiCF$_3$SO$_3$), lithium bistrifluoromethylsulfonylimide (LiN(CF$_3$SO$_2$)$_2$), and mixtures thereof. The electrolyte salt is preferably resistant to oxidation even at a high potential, and is most preferably LiPF$_6$.

The organic solvent contains as a component (hereinafter, the first solvent) at least one of methyl propionate and ethyl propionate. Ethyl propionate is more strongly attracted to the solid electrolyte than other solvents, and has a low viscosity. Thus, ethyl propionate is very effective at decreasing a resistance of the secondary battery.

The content of the first solvent in the nonaqueous electrolytic solution can be set to be in a range of 1% by volume to 95% by volume. The preferable range is from 10% by volume to 90% by volume, and the more preferable range is from 30% by volume to 70% by volume.

The nonaqueous electrolytic solution may contain another solvent (hereinafter, the second solvent) in addition to the first solvent. Examples of the second solvent include cyclic carbonates such as propylene carbonate (PC), ethylene carbonate (EC), buthylene carbonate (BC), and vinylene carbonate (VC); linear carbonates, other than the first solvent, such as diethyl carbonate (DEC), dimethyl carbonate (DMC), and methyl ethyl carbonate (MEC); cyclic ethers such as tetrahydrofuran (THF), 2-methyl tetrahydrofuran (2-MeTHF), and dioxolane (DOX); linear ethers such as dimethoxy ethane (DME) and diethoxy ethane (DEE); γ-butyrolactone (GBL), acetonitrile (AN), and sulfolane (SL). These solvents may be used singularly or as a mixed solvent.

The second solvent may contain a cyclic carbonate and another linear carbonate excluding the first solvent. This will ensure that the viscosity and ion conductivity rate of the nonaqueous electrolytic solution are appropriate.

6) Container Member

As the container member, for example, a container made of laminate film or a container made of metal may be used.

The thickness of the laminate film is, for example, 0.5 mm or less, and preferably 0.2 mm or less.

As the laminate film, a multilayer film including multiple resin layers and a metal layer sandwiched between the resin layers is used. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member by heat-sealing.

The wall thickness of the metal container is, for example, 1 mm or less, more preferably 0.5 mm or less, and still more preferably 0.2 mm or less.

The metal container is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylindrical, coin-shaped, or button-shaped. The container member may be appropriately selected depending on battery size and use of the battery.

Next, an example of stacking the positive electrode, the negative electrode, the first porous layer, and the second porous layer in the electrode group will be described with reference to FIGS. 1 and 2.

As shown in FIG. 1, an electrode group 1 includes a positive electrode 3, a negative electrode 4, and a separator layer 5. The positive electrode 3 includes a positive electrode current collector 3a and positive electrode active material-containing layers 3b carried or held by both principal surfaces of the positive electrode current collector 3a. On the other hand, the negative electrode 4 includes a negative electrode current collector 4a and negative electrode active material-containing layers 4b carried or held by both principal surfaces of the negative electrode current collector 4a. The separator layer 5 includes a first porous layer 5a and a second porous layer 5b. They are all sheet-shaped, and stacked in order of the negative electrode active material-containing layer 4b, the negative electrode current collector 4a, the negative electrode active material-containing layer 4b, the second porous layer 5b, the first porous layer 5a, the positive electrode active material-containing layer 3b, the positive electrode current collector 3a, and the positive electrode active material-containing layer 3b, in direction C intersecting their respective principal surfaces. One principal surface 101 of the first porous layer 5a as a first surface is in contact with a principal surface (third surface) of the second porous layer 5b. The other principal surface 102 of the first porous layer 5a as a second surface is in contact with a principal surface of the positive electrode active material-containing layer 3b. A fourth surface of the second porous layer 5b parallel to the third surface is in contact with a principal surface of the negative electrode active material-containing layer 4b. Each layer constituting the electrode group 1 is impregnated with the nonaqueous electrolytic solution. Here, thickness A of the first porous layer 5a is a distance between the principal surfaces of the first porous layer 5a, and thickness B of the second porous layer 5b is a distance between the principal surfaces of the second porous layer 5b.

Figure 2:
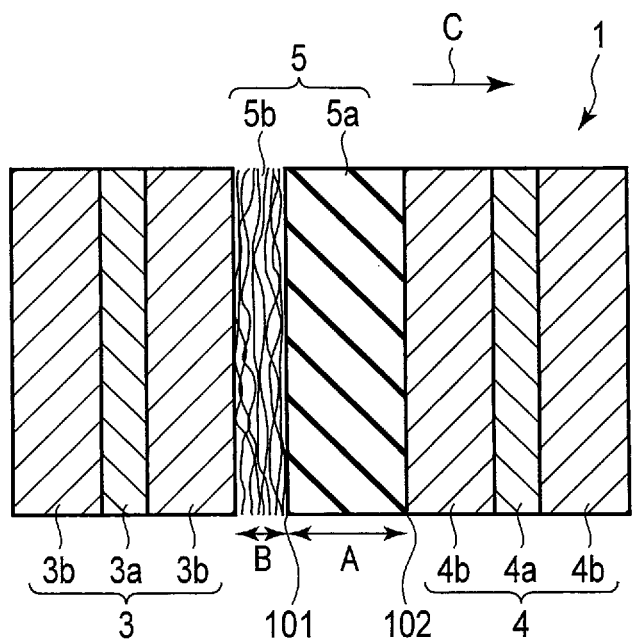
FIG. 2 is a cross-sectional view showing another example of an electrode group of a secondary battery according to the embodiment.

As shown in FIG. 2, the first porous layer 5a and the second porous layer 5b may be arranged opposite to each other. In the electrode group 1, the positive electrode active material-containing layer 3b, the positive electrode current collector 3a, the positive electrode active material-containing layer 3b, the second porous layer 5b, the first porous layer 5a, the negative electrode active material-containing layer 4b, the negative electrode current collector 4a, and the negative electrode active material-containing layer 4b are stacked in this order in direction C intersecting their respective principal surfaces. One principal surface 101 of the first porous layer 5a as the first surface is in contact with the principal surface of the second porous layer 5b. The other principal surface 102 of the first porous layer 5a as the second surface is in contact with the principal surface of the negative electrode active material-containing layer 4b.

A method of measuring the thicknesses (A+B) of the separator layer, the thickness A of the first porous layer, and the thickness B of the second porous layer will be described below. The battery is disassembled in a glove box filled with argon to extract the electrode group. The electrode group may be washed and vacuum dried to remove the nonaqueous electrolytic solution in the electrode group. Subsequently, in the glove box, the thickness of the electrode group is measured while applying a predetermined load (for example, 10 g/cm$^2$) to the electrode group using a flat plate. While the flat plate is arranged on the electrode group, the electrode group is cut in parallel with each of the positions corresponding to 10%, 50%, and 90% of the thickness of the electrode group from the surface of the electrode group contacting the flat plate. As a result, four electrode group samples divided in the direction perpendicular to the thickness of the electrode group are obtained. Each of the four electrode group samples is cut in a cross shape to pass through the center in the in-plane direction of the electrode group sample. With respect to each electrode group sample, one portion on a cross section obtained by cutting along one direction of the cross shape and one portion on a cross section obtained by cutting along the other direction of the cross shape are observed by a scanning electron microscope (SEM). Therefore, the eight portions in total are observed. Furthermore, the observation magnification by the SEM is 100 to 1000. In the field of view of each of the eight portions, the thickness B of the second porous layer, the thickness A of the first porous layer, and the thickness (A+B) of the separator layer are measured. The averages of the obtained measured values are obtained as the thicknesses A and B, and the sum of A and B.

The method of taking out the first porous layer and the second porous layer from the battery for measurement, etc.

of void fractions of the first porous layer and the second porous layer will be described below. The battery is disassembled in a glove box filled with argon, and the electrode group is removed. The electrode group may be washed to remove the nonaqueous electrolytic solution in the electrode group by vacuum drying. The first porous layer is removed together with the adjacent positive electrode 3 or negative electrode 4, and the void fraction is measured by the above-described method from the 3D measurement scanning electron microscopy (3D-SEM) image. The second porous layer is removed from the electrode group, and the void fraction is measured by the mercury porosimetry described above. If it is difficult to separate the second porous layer from the adjacent positive electrode 3 or negative electrode 4, the void fraction of the second porous layer may be obtained by first measuring it with the void fraction of the adjacent positive electrode 3 or negative electrode 4, removing the second porous layer, and then measuring the void fraction of the positive electrode 3 or negative electrode 4.

An example of a secondary battery according to the embodiment will be described with reference to FIGS. 3 and 6.

FIGS. 3 and 4 show an example of a secondary battery using a metal container.

An electrode group 1 is stored in a rectangular tubular metal container 2. The electrode group 1 is formed, for example, by spirally winding a positive electrode 3 and a negative electrode 4 around an axis parallel to a short-side direction thereof with a separator layer 5 interposing therebetween so as to form a flat shape. In the separator layer 5, the first porous layer covers the surface (principal surface) of the positive electrode active material-containing layer, and the second porous layer covers the surface (principal surface) of the negative electrode active material-containing layer. As shown in FIG. 4, a strip-shaped positive electrode lead 7 is electrically connected to each of a plurality of portions at an end of the positive electrode 3 located on an end face of the electrode group 1 intersecting the electrode stack direction. A strip-shaped negative electrode lead 7 is electrically connected to each of a plurality of portions at an end of the negative electrode 4 located on the end face. The plurality of positive electrode leads 6 are bundled, and in this state, electrically connected to a positive electrode current collecting tab 8. A positive electrode terminal is formed from the positive electrode leads 6 and the positive electrode current collecting tab 8. In addition, the negative electrode leads 7 are bundled, and in this state, connected to a negative electrode current collecting tab 9. A negative electrode terminal is formed from the negative electrode leads 7 and the negative electrode current collecting tab 9. A sealing plate 10 made of a metal is fixed to the opening portion of the metal container 2 by welding or the like. The positive electrode current collecting tab 8 and the negative electrode current collecting tab 9 are extracted to the outside from outlet holes formed in the sealing plate 10, respectively. The inner surface of each outlet hole of the sealing plate 10 is covered with an insulating member 11 to avoid a short circuit caused by contact between the positive electrode current collecting tab 8 and the negative electrode current collecting tab 9.

FIGS. 5 and 6 show an example of a secondary battery using a container member made of a laminated film.

As shown in FIGS. 5 and 6, the flat wound electrode group 1 is stored in a sack-shaped container member 12 made of a laminated film including a metal layer interposing between two resin films. The flat wound electrode group 1 is formed by spirally winding, around an axis parallel to the short-side direction, a stacked structure obtained by stacking the negative electrode 4, the separator layer 15, the positive electrode 3, and the separator layer 15 in this order from the outside, and pressing the stacked structure. In the separator layer 15, the first porous layer covers the surface (principal surface) of the positive electrode active material-containing layer, and the second porous layer covers the surface (principal surface) of the negative electrode active material-containing layer. The outermost negative electrode 4 has an arrangement in which a negative electrode layer (negative electrode active material-containing layer) 4b containing a negative electrode active material on one surface on the inner side of a negative electrode current collector 4a, as shown in FIG. 6, and the remaining negative electrodes 4 are arranged by forming the negative electrode layers 4b on both surfaces of the negative electrode current collector 4a. The positive electrode 3 is arranged by forming positive electrode layers (positive electrode active material-containing layers) 3b on both surfaces of a positive electrode current collector 3a.

Near the outer end of the wound electrode group 1, a negative electrode terminal 13 is connected to the negative electrode current collector 4a of the outermost negative electrode 4, and a positive electrode terminal 14 is connected to the positive electrode current collector 3a of the positive electrode 3 on the inner side. The negative electrode terminal 13 and the positive electrode terminal 14 extend outward from the opening portion of the sack-shaped container 12. The opening portion of the sack-shaped container 12 is heat-sealed, thereby sealing the wound electrode group 1. At the time of heat sealing, the negative electrode terminal 13 and the positive electrode terminal 14 are sandwiched by the sack-shaped container member 12 in the opening portion.

The secondary battery according to the first embodiment described above contains a nonaqueous electrolytic solution that includes as a first solvent at least one of methyl propionate and ethyl propionate. The nonaqueous electrolytic solution includes a second solvent different from the first solvent. The first porous layer has a void fraction of from 10% by volume to 50% by volume, and the second porous layer has a void fraction greater than the void fraction of the first porous layer. In this secondary battery, output performance can improve while self-discharge is suppressed.

Second Embodiment

A battery pack according to the second embodiment can include one or more secondary batteries (single batteries) according to the first embodiment. The plural secondary batteries can be electrically connected in series, in parallel, or in a combination of series connection and parallel connection, thereby forming a battery module. The battery pack according to the second embodiment may include plural battery modules.

The battery pack according to the second embodiment may further include a protective circuit. The protective circuit has a function of controlling charge/discharge of a secondary battery. Alternatively, a circuit included in a device (for example, an electronic device or an automobile) that uses a battery pack as a power supply can be used as the protective circuit of the battery pack.

The battery pack according to the second embodiment can further include an external power distribution terminal. The external power distribution terminal is configured to output a current from the secondary battery to the outside and input a current to the secondary battery. In other words, when the battery pack is used as a power supply, a current is supplied to the outside via the external power distribution terminal. Additionally, when charging the battery pack, a charge current (including regenerative energy of the power of a vehicle such as an automobile) is supplied to the battery pack via the external power distribution terminal.

Figure 7:
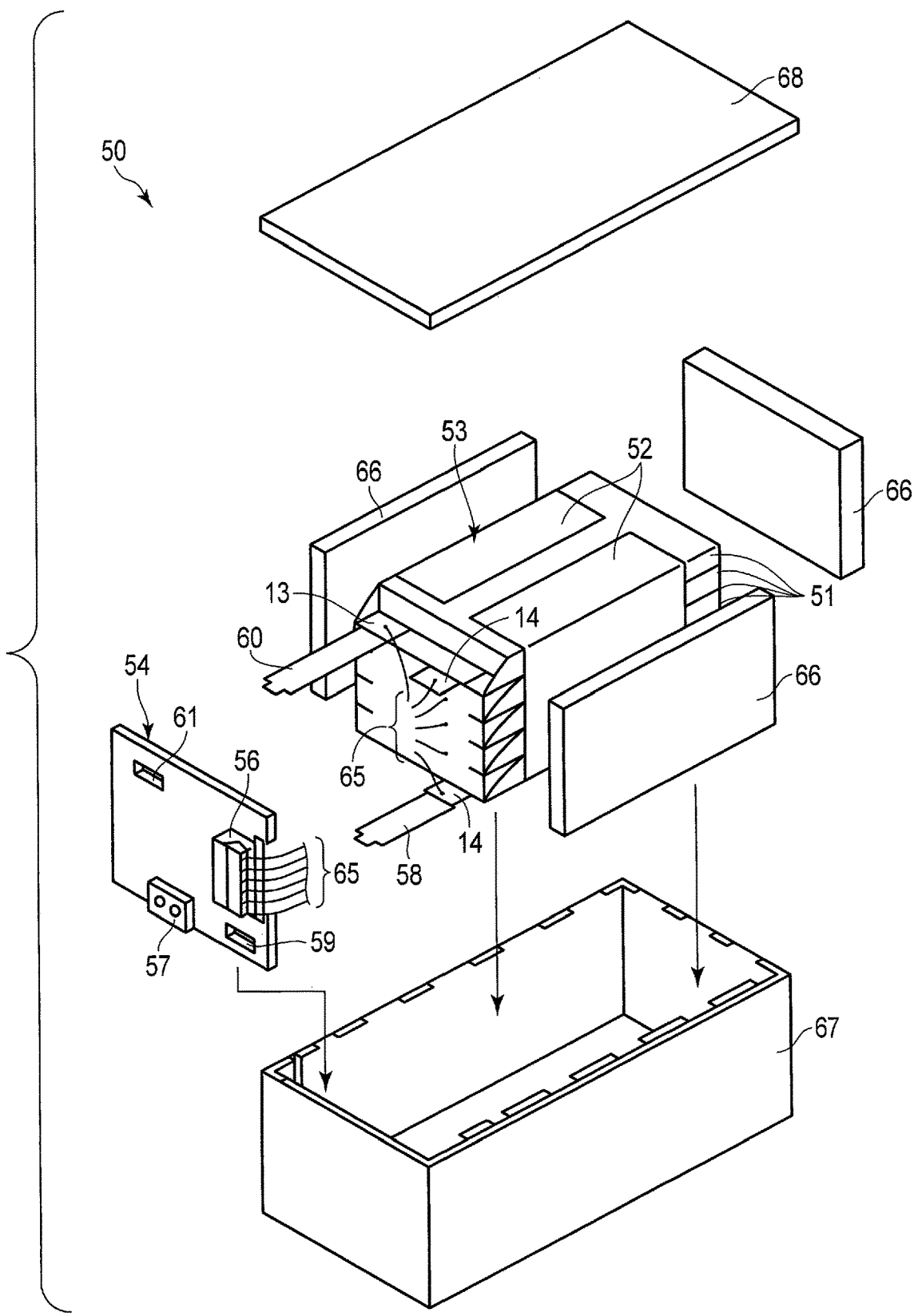
FIG. 7 is an exploded perspective view of a battery pack according to the embodiment.
Figure 8:
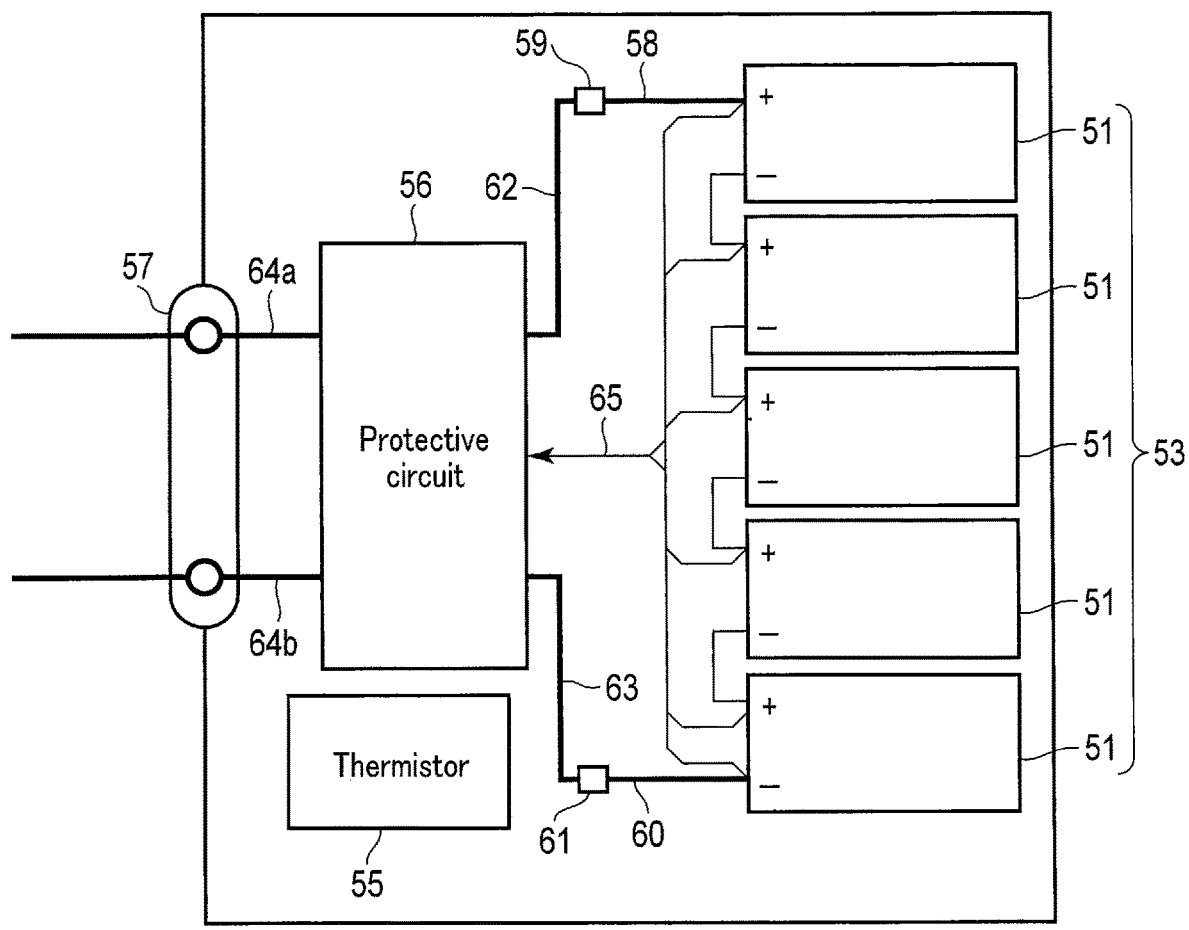
FIG. 8 is a block diagram showing an electric circuit of the battery pack shown in FIG. 7.

FIGS. 7 and 8 show an example of a battery pack 50. The battery pack 50 includes a plurality of flat batteries having the structure shown in FIG. 5. FIG. 7 is an exploded perspective view of the battery pack 50, and FIG. 8 is a block diagram showing an electric circuit of the battery pack 50 of FIG. 7.

Plural single batteries 51 are stacked so that the negative electrode terminals 13 and the positive electrode terminals 14 extended outside are arranged in the same direction, and fastened with an adhesive tape 52 to configure a battery module 53. The single batteries 51 are electrically connected to each other in series as shown in FIG. 8.

A printed wiring board 54 is arranged to face opposite to the side plane of the single battery 51 where the negative electrode terminal 13 and the positive electrode terminal 14 extend out from. A thermistor 55, a protective circuit 56, and an energizing terminal 57 to an external device as the external power distribution terminal are mounted on the printed wiring board 54 as shown in FIG. 8. An electric insulating plate (not shown) is attached to the surface of the printed wiring board 54 facing the battery module 53 to avoid unnecessary connection of the wires of the battery module 53.

A positive electrode-side lead 58 is connected to the positive electrode terminal 14 located at the bottom layer of the battery module 53 and the distal end of the lead 58 is inserted into a positive electrode-side connector 59 of the printed wiring board 54 so as to be electrically connected. A negative electrode-side lead 60 is connected to the negative electrode terminal 13 located at the top layer of the battery module 53 and the distal end of the lead 60 is inserted into a negative electrode-side connector 61 of the printed wiring board 54 so as to be electrically connected. The connectors 59 and 61 are connected to the protective circuit 56 through wires 62 and 63 formed on the printed wiring board 54.

The thermistor 55 detects the temperature of the single batteries 51, and the detection signal is sent to the protective circuit 56. The protective circuit 56 can shut down a plus-side wire 64a and a minus-side wire 64b between the protective circuit 56 and the energizing terminal 57 to an external device under a predetermined condition. The predetermined condition indicates, for example, the case where the temperature detected by the thermistor 55 becomes a predetermined temperature or more. Another example of the predetermined condition indicates the case where the over-charge, over-discharge, or over-current of the single batteries 51 is detected. The detection of the over-charge and the like is performed on each of the single batteries 51 individually or all of the single batteries 51 together. When each of the single batteries 51 is detected individually, the battery voltage may be detected, or a positive electrode or negative electrode potential may be detected. In the latter case, a lithium electrode to be used as a reference electrode is inserted into each of the single batteries 51. In the case of the battery pack of FIGS. 7 and 8, wires 65 for voltage detection are connected to each of the single batteries 51, and detection signals are sent to the protective circuit 56 through the wires 65.

Protective sheets 66 made of rubber or resin are arranged on three side planes of the battery module 53, excluding the side plane from which the positive electrode terminal 14 and the negative electrode terminal 13 protrude out from.

The battery module 53 is housed in a housing container 67 together with each of the protective sheets 66 and the printed wiring board 54. That is, the protective sheets 66 are arranged on both internal surfaces in a long-side direction and on one internal surface in a short-side direction of the housing container 67. The printed wiring board 54 is arranged on the internal surface on the opposite side in a short-side direction. The battery module 53 is located in a space surrounded by the protective sheets 66 and the printed wiring board 54. A lid 68 is attached to the upper surface of the housing container 67.

In order to fix the battery module 53, a heat-shrinkable tape may be, used in place of the adhesive tape 52. In this case, the battery module is bound by placing the protective sheets on both sides of the battery module, revolving the heat-shrinkable tape, and thermally shrinking the heat-shrinkable tape.

In FIGS. 7 and 8, the form in which the single batteries 51 are connected in series is shown. However, in order to increase the battery capacity, the batteries may be connected in parallel. Alternatively, the batteries may be formed by combining series connection and parallel connection. The assembled battery pack can be connected in series or in parallel.

The battery pack shown in FIGS. 7 and 8 includes one battery module, but the battery pack according to the second embodiment may include a plurality of battery modules. The plurality of battery modules are electrically connected in series, in parallel, or in a combination of series connection and parallel connection.

The form of the battery pack is appropriately changed in accordance with the application purpose. The battery pack according to this embodiment is preferably used for an application purpose requiring that excellent cycle performance be obtained at the time of extracting a large current. More specifically, the battery pack is used as a power supply for a digital camera, a battery for a vehicle such as a two- or four-wheeled hybrid electronic automobile, a two- or four-wheeled electronic automobile, an electric bicycle, or a railway vehicle (for example, an electric train), or a stationary battery. In particular, the battery pack is preferably used as an onboard battery mounted in a vehicle.

The battery pack according to the second embodiment described above includes the secondary battery according to the first embodiment, and can realize excellent output performance while self-discharge is suppressed.

Third Embodiment

A vehicle according to the third embodiment includes one or two or more secondary batteries according to the first embodiment, or the battery pack according to the second embodiment.

In a vehicle such as an automobile in which the battery pack according to the second embodiment is mounted, the battery pack is configured to, for example, collect regenerative energy of the power of the vehicle. The vehicle may include a mechanism of converting the kinetic energy of the vehicle into regenerative energy.

Figure 9:
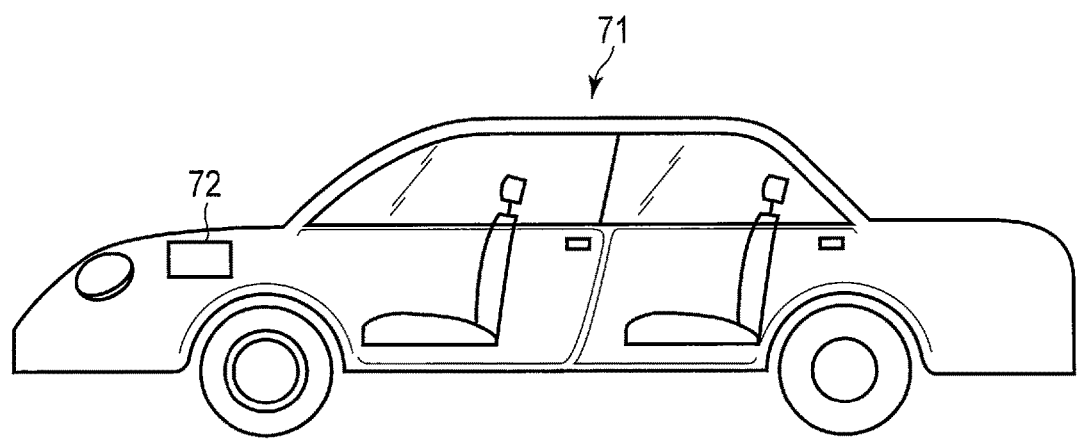
FIG. 9 is a schematic view showing an example of a vehicle installed with the secondary battery according the embodiment.

FIG. 9 shows an example of an automobile including a battery pack as an example according to the embodiment.

An automobile 71 shown in FIG. 9 includes a battery pack 72 as an example according to the embodiment, that is mounted in an engine room on the front side of the vehicle body. The mount position of the battery pack in the automobile is not limited to the engine room. For example, the battery pack can be mounted on the rear side of the vehicle body or under a seat of the automobile.

Figure 10:
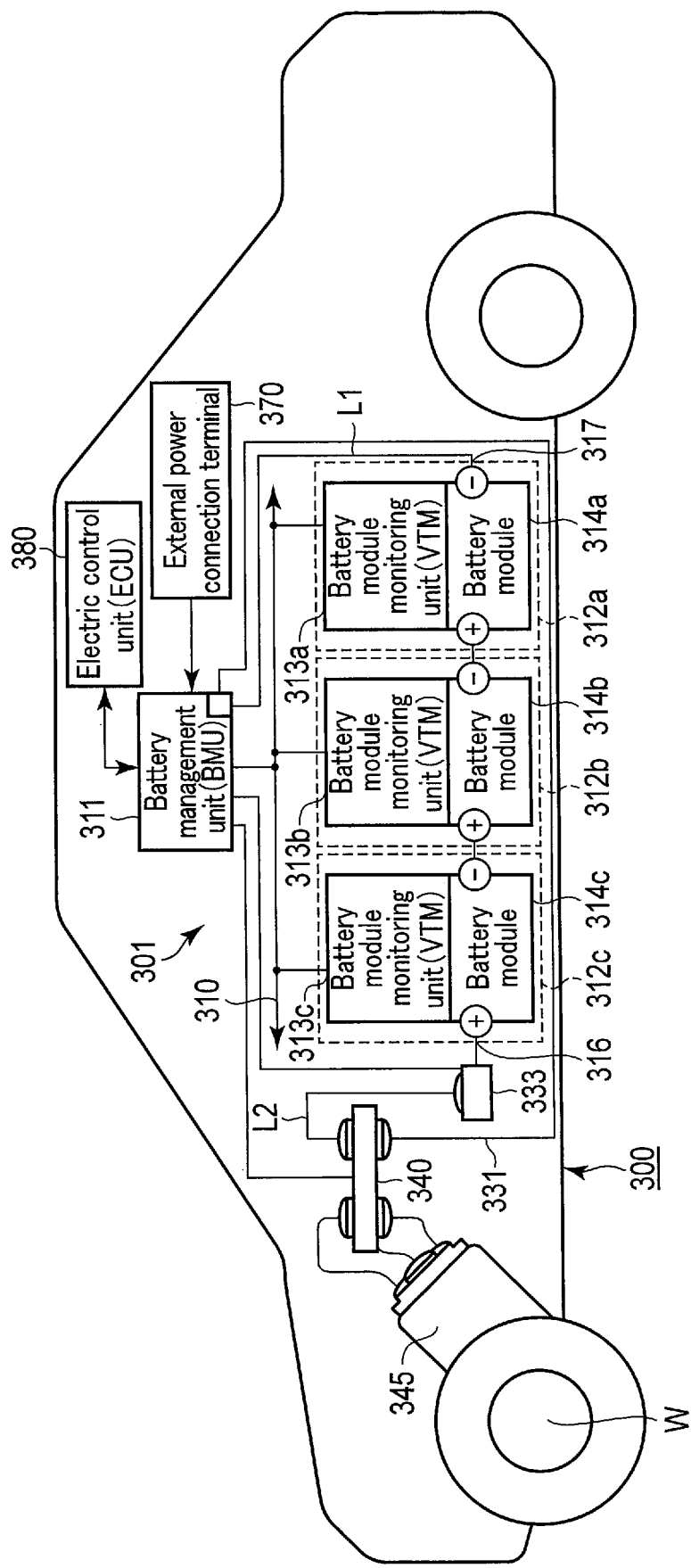
FIG. 10 is a view schematically showing another example of the vehicle according to the embodiment.

FIG. 10 is a view schematically showing the arrangement of an example of the vehicle according to the embodiment. A vehicle 300 shown in FIG. 10 is an electric automobile.

The vehicle 300, shown in FIG. 10, includes a vehicle power source 301, a vehicle ECU (electric control unit) 380, which is a master controller of the vehicle power source 301, an external terminal (an external power connection terminal) 370, an inverter 340, and a drive motor 345.

The vehicle 300 includes the vehicle power source 301, for example, in the engine compartment, in the rear sections of the automobile body, or under a seat. In FIG. 10, the position of the secondary battery installed in the vehicle 300 is schematically shown.

The vehicle power source 301 includes plural (for example, three) battery packs 312a, 312b and 312c, a BMU (a battery management unit) 311, and a communication bus 310.

The three battery packs 312a, 312b and 312c are electrically connected to each other in series. The battery pack 312a includes a battery module 314a and a battery module monitoring unit (VTM: voltage temperature monitoring) 313a. The battery pack 312b includes a battery module 314b and a battery module monitoring unit 313b. The battery pack 312c includes a battery module 314c and a battery module monitoring unit 313c. The battery packs 312a, 312b and 312c can each be independently removed, and may be exchanged by a different battery pack.

Each of the battery modules 314a to 314c includes plural secondary batteries connected to each other in series. Each secondary battery is the secondary battery according to the embodiment. The battery modules 314a to 314c each perform charging and discharging through a positive electrode terminal 316 and a negative electrode terminal 317.

In order to collect information concerning security of the vehicle power source 301, the battery management unit 311 performs communication with the battery module monitoring units 313a to 313c and collects information such as voltages or temperatures of the secondary batteries of the battery modules 314a to 314c included in the vehicle power source 301.

The communication bus 310 is connected between the battery management unit 311 and the battery module monitoring units 313a to 313c. The communication bus 310 is configured so that multiple nodes (i.e., the battery management unit and one or more battery module monitoring units) share a set of communication lines. The communication bus 310 is, for example, a communication bus configured based on CAN (Control Area Network) standard.

The battery module monitoring units 313a to 313c measure a voltage and a temperature of each secondary battery in the battery modules 314a to 314c based on communications from the battery management unit 311. It is possible, however, to measure the temperatures only at several points per battery module, and the temperatures of all of the secondary batteries need not be measured.

The vehicle power source 301 may also have an electromagnetic contactor (for example, a switch unit 333 shown in FIG. 10) for switching connection between the positive electrode terminal and the negative electrode terminal. The switch unit 333 includes a precharge switch (not shown), which is turned on when the battery modules 314a to 314c are charged, and a main switch (not shown), which is turned on when battery output is supplied to a load. The precharge switch and the main switch include a relay circuit (not shown), which is turned on or off based on a signal supplied to a coil located near the switch element.

The inverter 340 converts an input DC (direct current) voltage to a three-phase AC (alternate current) high voltage for driving a motor. The inverter 340 controls an output voltage based on control signals from the battery management unit 311 or the vehicle ECU 380, which controls the whole operation of the vehicle. Three-phase output terminal (s) of the inverter 340 are connected to each three-phase input terminal of the drive motor 345.

The drive motor 345 is rotated by electric power supplied from the inverter 340, and the rotation is transferred to an axle and driving wheels W, for example, through a differential gear unit.

The vehicle 300 also includes a regenerative brake mechanism, though not shown. The regenerative brake mechanism rotates the drive motor 345 when the vehicle 300 is braked, and converts kinetic energy into regenerative energy, as electric energy. The regenerative energy, recovered in the regenerative brake mechanism, is input into the inverter 340 and converted to direct current. The direct current is input into the vehicle power source 301.

One terminal of a connecting line L1 is connected through a current detector (not shown) in the battery management unit 311 to the negative electrode terminal 317 of the vehicle power source 301. The other terminal of the connecting line L1 is connected to a negative electrode input terminal of the inverter 340.

One terminal of a connecting line L2 is connected through the switch unit 333 to the positive electrode terminal 316 of the vehicle power source 301. The other terminal of the connecting line L2 is connected to a positive electrode input terminal of the inverter 340.

The external terminal 370 is connected to the battery management unit 311. The external terminal 370 is able to connect, for example, to an external power source.

The vehicle ECU 380 cooperatively controls the battery management unit 311 together with other units in response to inputs operated by a driver or the like, thereby performing the management of the whole vehicle. Data concerning the security of the vehicle power source 301, such as a remaining capacity of the vehicle power source 301, are transferred between the battery management unit 311 and the vehicle ECU 380 through communication lines.

The vehicle according to the third embodiment includes the battery pack including the secondary batteries according to the embodiment, and the battery pack (for example, the battery packs 312a, 312b, and 312c) has excellent self-discharge performance and output performance. Therefore, a reliable vehicle having excellent charge and discharge performance can be obtained. In addition, each battery pack is inexpensive and safe. It is therefore possible to suppress the cost of the vehicle and increase the safety.

EXAMPLES

Hereinafter, examples of the present invention will be described in detail with reference to the accompanying drawings; however, the present invention is not limited to the examples to be described below.

Example 1

(Production of Negative Electrode)

A negative electrode was produced in the following manner.

First, 100 parts by mass of an active material, 6 parts by mass of an electro-conductive agent, and 4 parts by mass of a binder were dispersed in a solvent to prepare a slurry. As the active material, monoclinic niobium-titanium composite oxide ($Nb_2TiO_7$) particles were used. As the electro-conductive agent, a mixture of acetylene black and graphite was used. A mass ratio of acetylene black to graphite in the mixture was 1:2. As the binder, a mixture of carboxymethyl cellulose (CMC) and styrene-butadiene rubber (SBR) was used. A mass ratio of CMC to SBR in the mixture was 1:1. As the solvent, pure water was used.

Next, the obtained slurry was applied to both surfaces of a current collector, and the applied slurry was dried, thereby obtaining an active material-containing layer. As the current collector, an aluminum foil having a thickness of 12 µm was used. After the resultant was dried at 130° C. for 12 hours under vacuum, the current collector and the active material-containing layer were press-rolled by a roll press apparatus, thereby obtaining a negative electrode. The density of the active material-containing layer after the pressing was 2.5 g/cm³. The same press pressure was used throughout the examples and comparative examples.

(Production of Positive Electrode)

A positive electrode was produced in the following manner.

First, a positive electrode active material, an electro-conductive agent, and a binder were dispersed in a solvent to prepare a slurry. The proportions of the positive electrode active material, the electro-conductive agent, and the binder were 93% by mass, 5% by mass, and 2% by mass, respectively. As the positive electrode active material, lithium nickel cobalt manganese composite oxide ($LiNi_{0.5}Co_{0.2}Mn_{0.3}O_2$) particles were used. As the electro-conductive agent, a mixture of acetylene black and carbon black was used. A mass ratio of acetylene black to carbon black in the mixture was 2:1. As the binder, polyvinylidene fluoride (PVdF) was used. As the solvent, N-methylpyrrolidone (NMP) was used. Next, the prepared slurry was applied to both surfaces of the positive electrode current collector, and the applied slurry was dried, thereby obtaining a positive electrode active material-containing layer. As the positive electrode current collector, an aluminum alloy foil was used. After the resultant was dried at 130° C. for 12 hours in vacuum, the resultant was press-rolled so that a density of the active material-containing layer (excluding the current collector) was 3.2 g/cm³, thereby obtaining a positive electrode.

(Production of Solid Electrolyte Layer)

As the first porous layer, a solid electrolyte layer was formed directly on each positive electrode active material-containing layer of the positive electrode. Specifically, first, LATP ($Li_2O$—$Al_2O_3$—$SiO_2$—$P_2O_5$—$TiO_2$ (composition including each oxide as elements)) particles as solid electrolyte particles, PVdF, and NMP were mixed to prepare a slurry. A mass ratio of LATP to PVdF in the slurry was 100:1. This slurry was applied onto one active material-containing layer of the positive electrode by a microgravure method, and the coat was dried to remove the solvent, thereby forming a solid electrolyte layer. Next, a solid electrolyte layer was formed directly on the other positive electrode active material-containing layer in a similar manner. The proportion of the solid electrolyte in the solid electrolyte layer was 99% by mass.

(Production of Electrode Group)

The positive electrode and the negative electrode produced as described above were used. A cellulose nonwoven fabric as a second porous layer was sandwiched between the solid electrolyte layer on the positive electrode active material-containing layer and the negative electrode active material-containing layer, and they were stacked, thereby obtaining a stack. Next, this stack was wound using a winding axis parallel to a short-side direction of the stack and pressed to obtain a flat-shaped wound electrode group. A positive electrode terminal and a negative electrode terminal were electrically attached to this electrode group.

(Preparation of Nonaqueous Electrolytic Solution)

Propylene carbonate (PC) and methyl ethyl carbonate (MEC) were mixed at a volume ratio of 1:1 to prepare a mixed solvent. Ethyl propionate (EP) as the first solvent was mixed into the mixed solvent in such a manner that the proportion in the nonaqueous electrolytic solution was the value (33% by volume) shown in FIG. 1, thereby preparing an organic solvent. Lithium hexafluorophosphate ($LiPF_6$) was dissolved in the organic solvent at a concentration of 1M to prepare a nonaqueous electrolytic solution.

(Assembly of Nonaqueous Electrolyte Battery)

The electrode group and the nonaqueous electrolytic solution prepared as described above were housed in a container made of a laminate film to produce a battery having a design capacity of 1000 mAh. The obtained battery was defined as a nonaqueous electrolyte secondary battery of Example 1.

Table 1 shows the results of measuring, by the above-described method, the thickness and the void fraction of the first porous layer, and the thickness and the void fraction of the second porous layer.

Examples 2 to 5, Example 5A, and Example 5B

Secondary batteries were produced in the same manner as in Example 1 except that the void fractions of the first porous layer and the second porous layer were changed as shown in Table 1.

Comparative Examples 1, 2, 4 and 5

Secondary batteries were produced in the same manner as in Example 1 except that the void fractions of the first porous layer and the second porous layer were changed as shown in Table 1.

Comparative Example 3

A secondary battery was produced in the same manner as in Example 1 except that the second porous layer was not provided.

Comparative Example 6

A secondary battery was produced in the same manner as in Example 1 except that the first porous layer was not provided.

Comparative Examples 7 to 11

Secondary batteries were produced in the same manner as in Example 1 except that the first solvent was not used and the void fractions of the first porous layer and the second porous layer were changed as shown in Table 1.

For the secondary batteries described above, the self-discharge rates and the rate performances were measured by the following method, the results of which are shown in Table 1.

(Self-Discharge Rate)

The secondary battery was charged at 25° C. until the state of charge (SOC) reached 100%, and then discharged until the SOC became 0%. Next, the battery after discharge was charged until the SOC reached 50%, and a battery voltage immediately after charge was measured using a tester. The battery voltage at this time was defined as initial voltage V. Next, after the battery was allowed to stand at room temperature for 7 days, the battery voltage was measured using the tester. The battery voltage at this time was subtracted from the initial voltage V to calculate decreased voltage ΔV. Subsequently, the decreased voltage ΔV was divided by the initial voltage V to calculate a self-discharge rate (ΔV/V×100).

(Rate Performances)

The secondary battery was charged in an environment of 25° C. at a constant current of 1 C until the SOC reached 100%. Thereafter, the battery was charged at a constant voltage until the rate became 1/20 C. Then, the secondary battery was discharged at a rate of 5 C until the SOC was 0%. The discharge capacity at this time was measured to obtain discharge capacity W1. Next, this secondary battery was charged again at 25° C. and at a rate of 1 C until the SOC reached 100%. Thereafter, the battery was charged at a constant voltage until the rate became 1/20 C. Then, the secondary battery was discharged at 25° C. and at a rate of 1 C until the SOC was 0%. The discharge capacity at this time was measured to obtain discharge capacity W2. Next, the discharge capacity W1 was divided by the discharge capacity W2 to calculate a discharge capacity rate (discharge capacity W1/discharge capacity W2×100).

TABLE 1

| Table 1 | Negative Electrode Active Material | Positive Electrode Active Material | First Solvent | Content of First Solvent (vol %) | Second Solvent Type | Position of First Porous Layer |
|---|---|---|---|---|---|---|
| Example 1 | $Nb_2TiO_7$ | $LiNi_{0.5}Co_{0.2}Mn_{0.3}O_2$ | EP | 33 | PC:MEC = 1:1 | Positive electrode side |
| Example 2 | $Nb_2TiO_7$ | $LiNi_{0.5}Co_{0.2}Mn_{0.3}O_2$ | EP | 33 | PC:MEC = 1:1 | Positive electrode side |
| Example 3 | $Nb_2TiO_7$ | $LiNi_{0.5}Co_{0.2}Mn_{0.3}O_2$ | EP | 33 | PC:MEC = 1:1 | Positive electrode side |
| Example 4 | $Nb_2TiO_7$ | $LiNi_{0.5}Co_{0.2}Mn_{0.3}O_2$ | EP | 33 | PC:MEC = 1:1 | Positive electrode side |
| Example 5 | $Nb_2TiO_7$ | $LiNi_{0.5}Co_{0.2}Mn_{0.3}O_2$ | EP | 33 | PC:MEC = 1:1 | Positive electrode side |
| Example 5A | $Nb_2TiO_7$ | $LiNi_{0.5}Co_{0.2}Mn_{0.3}O_2$ | EP | 33 | PC:MEC = 1:1 | Positive electrode side |
| Example 5B | $Nb_2TiO_7$ | $LiNi_{0.5}Co_{0.2}Mn_{0.3}O_2$ | EP | 33 | PC:MEC = 1:1 | Positive electrode side |
| Comparative Example 1 | $Nb_2TiO_7$ | $LiNi_{0.5}Co_{0.2}Mn_{0.3}O_2$ | EP | 33 | PC:MEC = 1:1 | Positive electrode side |
| Comparative Example 2 | $Nb_2TiO_7$ | $LiNi_{0.5}Co_{0.2}Mn_{0.3}O_2$ | EP | 33 | PC:MEC = 1:1 | Positive electrode side |
| Comparative Example 3 | $Nb_2TiO_7$ | $LiNi_{0.5}Co_{0.2}Mn_{0.3}O_2$ | EP | 33 | PC:MEC = 1:1 | Positive electrode side |
| Comparative Example 4 | $Nb_2TiO_7$ | $LiNi_{0.5}Co_{0.2}Mn_{0.3}O_2$ | EP | 33 | PC:MEC = 1:1 | Positive electrode side |
| Comparative Example 5 | $Nb_2TiO_7$ | $LiNi_{0.5}Co_{0.2}Mn_{0.3}O_2$ | EP | 33 | PC:MEC = 1:1 | Positive electrode side |
| Comparative Example 6 | $Nb_2TiO_7$ | $LiNi_{0.5}Co_{0.2}Mn_{0.3}O_2$ | EP | 33 | PC:MEC = 1:1 | — |
| Comparative Example 7 | $Nb_2TiO_7$ | $LiNi_{0.5}Co_{0.2}Mn_{0.3}O_2$ | — | 0 | PC:MEC = 1:1 | Positive electrode side |
| Comparative Example 8 | $Nb_2TiO_7$ | $LiNi_{0.5}Co_{0.2}Mn_{0.3}O_2$ | — | 0 | PC:MEC = 1:1 | Positive electrode side |
| Comparative Example 9 | $Nb_2TiO_7$ | $LiNi_{0.5}Co_{0.2}Mn_{0.3}O_2$ | — | 0 | PC:MEC = 1:1 | Positive electrode side |
| Comparative Example 10 | $Nb_2TiO_7$ | $LiNi_{0.5}Co_{0.2}Mn_{0.3}O_2$ | — | 0 | PC:MEC = 1:1 | Positive electrode side |
| Comparative Example 11 | $Nb_2TiO_7$ | $LiNi_{0.5}Co_{0.2}Mn_{0.3}O_2$ | — | 0 | PC:MEC = 1:1 | Positive electrode side |

| Table 1 | Thickness of First Porous Layer (μm) | Void Fraction of First Porous Layer (vol %) | Material of Second Porous Layer | Thickness of Second Porous Layer (μm) | Void Fraction of Second Porous Layer (vol %) | Rate Performance 5 C/1 C Capacity Rate (%) | Self-Discharge Rate (%) |
|---|---|---|---|---|---|---|---|
| Example 1 | 3 | 40 | cellulose | 10 | 50 | 81 | 2.3 |
| Example 2 | 3 | 40 | cellulose | 10 | 60 | 82 | 2.5 |
| Example 3 | 3 | 40 | cellulose | 10 | 80 | 83 | 2.9 |
| Example 4 | 3 | 20 | cellulose | 10 | 50 | 82 | 2.2 |
| Example 5 | 3 | 30 | cellulose | 10 | 50 | 84 | 2.2 |
| Example 5A | 3 | 10 | cellulose | 10 | 50 | 81 | 2.2 |
| Example 5B | 3 | 50 | cellulose | 10 | 60 | 80 | 3.0 |
| Comparative Example 1 | 3 | 40 | cellulose | 10 | 30 | 74 | 2.1 |
| Comparative Example 2 | 3 | 40 | cellulose | 10 | 40 | 78 | 2.2 |
| Comparative Example 3 | 3 | 40 | N/A | — | — | 85 | 6.3 |
| Comparative Example 4 | 3 | 50 | cellulose | 10 | 50 | 79 | 2.6 |
| Comparative Example 5 | 3 | 60 | cellulose | 10 | 50 | 76 | 2.8 |
| Comparative Example 6 | N/A | — | cellulose | 10 | 50 | 70 | 3.5 |

TABLE 1-continued

| | | | | | | | |
|---|---|---|---|---|---|---|---|
| Comparative Example 7 | 3 | 40 | cellulose | 10 | 30 | 65 | 2 |
| Comparative Example 8 | 3 | 40 | cellulose | 10 | 50 | 70 | 2.3 |
| Comparative Example 9 | 3 | 40 | cellulose | 10 | 80 | 72 | 2.9 |
| Comparative Example 10 | 3 | 20 | cellulose | 10 | 50 | 71 | 2.1 |
| Comparative Example 11 | 3 | 60 | cellulose | 10 | 50 | 73 | 2.9 |

As is clear from Table 1, the secondary batteries of Examples 1 to 5, 5A and 5B have excellent rate performances as compared to those of the secondary batteries of Comparative Examples 1, 2 and 4 to 11. The secondary batteries of these examples have lower self-discharge rates than that of the secondary battery of Comparative Example 3. Thus, in the secondary batteries of the examples, the output performance such as rate performance can improve while self-discharge is suppressed. The comparison among Examples 1 to 5, 5A and 5B show that Examples 1 to 5 and 5A satisfying the condition that the first porous layer has a void fraction of from 10% by volume to 40% by volume have higher rate performances and lower self-discharge rates than those of Example 5B in which the first porous layer has a void fraction of 50% by volume.

The rate performance decreases if the second porous layer has a void fraction equal to or smaller than that of the first porous layer as in Comparative Examples 1, 2, 4 and 5, and if the first porous layer is not used as in Comparative Example 6. In Comparative Example 3 in which the second porous layer is not used, the self-discharge rate is large. On the other hand, in Comparative Examples 7 to 11 in which the first solvent is not used, the rate performances decrease regardless of the void fraction of the first porous layer and the void fraction of the second porous layer.

Examples 6 to 14 and Comparative Examples 12 to 17

Secondary batteries were produced in the same manner as in Example 1 except that the kind of the negative electrode active material, the kind of the positive electrode active material, the kind of the first solvent, the content of the first solvent in the nonaqueous electrolytic solution, the kind of the second solvent, the position of the first porous layer, the thickness and void fraction of the first porous layer, the material forming the second porous layer, and the thickness and void fraction of the second porous layer were as shown in Table 2 below.

For the obtained secondary batteries, the self-discharge rates and the rate performances were measured by the method described above, the results of which are shown in Table 2.

TABLE 2

| Table 2 | Negative Electrode Active Material | Positive Electrode Active Material | First Solvent | Content of First Solvent (vol %) | Second Solvent Type | Position of First Porous Layer |
|---|---|---|---|---|---|---|
| Comparative Example 12 | $Nb_2TiO_7$ | $LiNi_{0.5}Co_{0.2}Mn_{0.3}O_2$ | EP | 10 | PC:MEC = 1:1 | Positive electrode side |
| Example 6 | $Nb_2TiO_7$ | $LiNi_{0.5}Co_{0.2}Mn_{0.3}O_2$ | EP | 10 | PC:MEC = 1:1 | Positive electrode side |
| Example 7 | $Nb_2TiO_7$ | $LiNi_{0.5}Co_{0.2}Mn_{0.3}O_2$ | EP | 10 | PC:MEC = 1:1 | Positive electrode side |
| Example 8 | $Nb_2TiO_7$ | $LiNi_{0.5}Co_{0.2}Mn_{0.3}O_2$ | EP | 10 | PC:MEC = 1:1 | Positive electrode side |
| Comparative Example 13 | $Nb_2TiO_7$ | $LiNi_{0.5}Co_{0.2}Mn_{0.3}O_2$ | EP | 10 | PC:MEC = 1:1 | Positive electrode side |
| Comparative Example 14 | $Nb_2TiO_7$ | $LiNi_{0.5}Co_{0.2}Mn_{0.3}O_2$ | EP | 50 | PC:MEC = 1:1 | Positive electrode side |
| Example 9 | $Nb_2TiO_7$ | $LiNi_{0.5}Co_{0.2}Mn_{0.3}O_2$ | EP | 50 | PC:MEC = 1:1 | Positive electrode side |
| Example 10 | $Nb_2TiO_7$ | $LiNi_{0.5}Co_{0.2}Mn_{0.3}O_2$ | EP | 50 | PC:MEC = 1:1 | Positive electrode side |
| Example 11 | $Nb_2TiO_7$ | $LiNi_{0.5}Co_{0.2}Mn_{0.3}O_2$ | EP | 50 | PC:MEC = 1:1 | Positive electrode side |
| Comparative Example 15 | $Nb_2TiO_7$ | $LiNi_{0.5}Co_{0.2}Mn_{0.3}O_2$ | EP | 50 | PC:MEC = 1:1 | Positive electrode side |
| Comparative Example 16 | $Nb_2TiO_7$ | $LiNi_{0.5}Co_{0.2}Mn_{0.3}O_2$ | EP | 80 | PC:MEC = 1:1 | Positive electrode side |
| Example 12 | $Nb_2TiO_7$ | $LiNi_{0.5}Co_{0.2}Mn_{0.3}O_2$ | EP | 80 | PC:MEC = 1:1 | Positive electrode side |
| Example 13 | $Nb_2TiO_7$ | $LiNi_{0.5}Co_{0.2}Mn_{0.3}O_2$ | EP | 80 | PC:MEC = 1:1 | Positive electrode side |
| Example 14 | $Nb_2TiO_7$ | $LiNi_{0.5}Co_{0.2}Mn_{0.3}O_2$ | EP | 80 | PC:MEC = 1:1 | Positive electrode side |
| Comparative Example 17 | $Nb_2TiO_7$ | $LiNi_{0.5}Co_{0.2}Mn_{0.3}O_2$ | EP | 80 | PC:MEC = 1:1 | Positive electrode side |

| Table 2 | Thickness of First Porous Layer (μm) | Void Fraction of First Porous Layer (vol %) | Material of Second Porous Layer | Thickness of Second Porous Layer (μm) | Void Fraction of Second Porous Layer (vol %) | Rate Performance 5 C/1 C Capacity Rate (%) | Self-Discharge Rate (%) |
|---|---|---|---|---|---|---|---|
| Comparative Example 12 | 3 | 40 | cellulose | 10 | 30 | 75 | 2.1 |
| Example 6 | 3 | 40 | cellulose | 10 | 50 | 80 | 2.4 |

TABLE 2-continued

| | | | | | | | |
|---|---|---|---|---|---|---|---|
| Example 7 | 3 | 40 | cellulose | 10 | 80 | 82 | 2.8 |
| Example 8 | 3 | 20 | cellulose | 10 | 50 | 81 | 2.1 |
| Comparative Example 13 | 3 | 60 | cellulose | 10 | 50 | 74 | 2.8 |
| Comparative Example 14 | 3 | 40 | cellulose | 10 | 30 | 78 | 2.1 |
| Example 9 | 3 | 40 | cellulose | 10 | 50 | 84 | 2.4 |
| Example 10 | 3 | 40 | cellulose | 10 | 80 | 86 | 2.9 |
| Example 11 | 3 | 20 | cellulose | 10 | 50 | 85 | 2.1 |
| Comparative Example 15 | 3 | 60 | cellulose | 10 | 50 | 79 | 2.9 |
| Comparative Example 16 | 3 | 40 | cellulose | 10 | 30 | 78 | 2.1 |
| Example 12 | 3 | 40 | cellulose | 10 | 50 | 85 | 2.2 |
| Example 13 | 3 | 40 | cellulose | 10 | 80 | 87 | 2.8 |
| Example 14 | 3 | 20 | cellulose | 10 | 50 | 86 | 2.1 |
| Comparative Example 17 | 3 | 60 | cellulose | 10 | 50 | 79 | 2.8 |

Examples 15 to 20 and Comparative Examples 18 to 26

Secondary batteries were produced in the same manner as in Example 1 except that the kind of the negative electrode active material, the kind of the positive electrode active material, the kind of the first solvent, the content of the first solvent in the nonaqueous electrolytic solution, the kind of the second solvent, the position of the first porous layer, the thickness and void fraction of the first porous layer, the material forming the second porous layer, and the thickness and void fraction of the second porous layer were as shown in Table 3 below.

For the obtained secondary batteries, the self-discharge rates and the rate performances were measured by the method described above, the results of which are shown in Table 3.

TABLE 3

| Table 3 | Negative Electrode Active Material | Positive Electrode Active Material | First Solvent | Content of First Solvent (vol %) | Second Solvent Type | Position of First Porous Layer |
|---|---|---|---|---|---|---|
| Comparative Example 18 | $Nb_2TiO_7$ | $LiNi_{0.5}Co_{0.2}Mn_{0.3}O_2$ | EP | 90 | PC:MEC = 1:1 | Positive electrode side |
| Example 15 | $Nb_2TiO_7$ | $LiNi_{0.5}Co_{0.2}Mn_{0.3}O_2$ | EP | 90 | PC:MEC = 1:1 | Positive electrode side |
| Example 16 | $Nb_2TiO_7$ | $LiNi_{0.5}Co_{0.2}Mn_{0.3}O_2$ | EP | 90 | PC:MEC = 1:1 | Positive electrode side |
| Example 17 | $Nb_2TiO_7$ | $LiNi_{0.5}Co_{0.2}Mn_{0.3}O_2$ | EP | 90 | PC:MEC = 1:1 | Positive electrode side |
| Comparative Example 19 | $Nb_2TiO_7$ | $LiNi_{0.5}Co_{0.2}Mn_{0.3}O_2$ | EP | 90 | PC:MEC = 1:1 | Positive electrode side |
| Comparative Example 20 | $Nb_2TiO_7$ | $LiNi_{0.5}Co_{0.2}Mn_{0.3}O_2$ | EP | 100 | — | Positive electrode side |
| Comparative Example 21 | $Nb_2TiO_7$ | $LiNi_{0.5}Co_{0.2}Mn_{0.3}O_2$ | EP | 100 | — | Positive electrode side |
| Comparative Example 22 | $Nb_2TiO_7$ | $LiNi_{0.5}Co_{0.2}Mn_{0.3}O_2$ | EP | 100 | — | Positive electrode side |
| Comparative Example 23 | $Nb_2TiO_7$ | $LiNi_{0.5}Co_{0.2}Mn_{0.3}O_2$ | EP | 100 | — | Positive electrode side |
| Comparative Example 24 | $Nb_2TiO_7$ | $LiNi_{0.5}Co_{0.2}Mn_{0.3}O_2$ | EP | 100 | — | Positive electrode side |
| Comparative Example 25 | $Nb_2TiO_7$ | $LiNi_{0.5}Co_{0.2}Mn_{0.3}O_2$ | EP | 80 | PC | Positive electrode side |
| Example 18 | $Nb_2TiO_7$ | $LiNi_{0.5}Co_{0.2}Mn_{0.3}O_2$ | EP | 80 | PC | Positive electrode side |
| Example 19 | $Nb_2TiO_7$ | $LiNi_{0.5}Co_{0.2}Mn_{0.3}O_2$ | EP | 80 | PC | Positive electrode side |
| Example 20 | $Nb_2TiO_7$ | $LiNi_{0.5}Co_{0.2}Mn_{0.3}O_2$ | EP | 80 | PC | Positive electrode side |
| Comparative Example 26 | $Nb_2TiO_7$ | $LiNi_{0.5}Co_{0.2}Mn_{0.3}O_2$ | EP | 80 | PC | Positive electrode side |

| Table 3 | Thickness of First Porous Layer (μm) | Void Fraction of First Porous Layer (vol %) | Material of Second Porous Layer | Thickness of Second Porous Layer (μm) | Void Fraction of Second Porous Layer (vol %) | Rate Performance 5 C/1 C Capacity Rate (%) | Self-Discharge Rate (%) |
|---|---|---|---|---|---|---|---|
| Comparative Example 18 | 3 | 40 | cellulose | 10 | 30 | 72 | 2.1 |
| Example 15 | 3 | 40 | cellulose | 10 | 50 | 80 | 2.3 |
| Example 16 | 3 | 40 | cellulose | 10 | 80 | 82 | 2.9 |
| Example 17 | 3 | 20 | cellulose | 10 | 50 | 81 | 2.2 |
| Comparative Example 19 | 3 | 60 | cellulose | 10 | 50 | 73 | 2.7 |

TABLE 3-continued

| | | | | | | | |
|---|---|---|---|---|---|---|---|
| Comparative Example 20 | 3 | 40 | cellulose | 10 | 30 | 66 | 2.1 |
| Comparative Example 21 | 3 | 40 | cellulose | 10 | 50 | 72 | 2.3 |
| Comparative Example 22 | 3 | 40 | cellulose | 10 | 80 | 75 | 2.9 |
| Comparative Example 23 | 3 | 20 | cellulose | 10 | 50 | 73 | 2.2 |
| Comparative Example 24 | 3 | 60 | cellulose | 10 | 50 | 67 | 2.8 |
| Comparative Example 25 | 3 | 40 | cellulose | 10 | 30 | 79 | 2.1 |
| Example 18 | 3 | 40 | cellulose | 10 | 50 | 87 | 2.3 |
| Example 19 | 3 | 40 | cellulose | 10 | 80 | 88 | 2.7 |
| Example 20 | 3 | 20 | cellulose | 10 | 50 | 90 | 2.2 |
| Comparative Example 26 | 3 | 60 | cellulose | 10 | 50 | 77 | 2.8 |

Of Table 2, Examples 6 to 8 and Comparative Examples 12 and 13 in which the content of the first solvent is 10% by volume will be compared_ Examples 6 to 8, satisfying the conditions that the first porous layer has a void fraction of from 10% by volume to 50% by volume and the second porous layer has a void fraction greater than that of the first porous layer, have higher rate performances than those of Comparative Examples 12 and 13 not satisfying these conditions.

Examples 9 to 11 and Comparative Examples 14 and 15 in which the content of the first solvent is 50% by volume will be compared. Examples 9 to 11, satisfying the conditions that the first porous layer has a void fraction of from 10% by volume to 50% by volume and the second porous layer has a void fraction greater than that of the first porous layer, have higher rate performances than those of Comparative Examples 14 and 15 not satisfying these conditions.

Examples 12 to 14 and Comparative Examples 16 and 17 in which the content of the first solvent is 80% by volume will be compared. Examples 12 to 14, satisfying the conditions that the first porous layer has a void fraction of from 10% by volume to 50% by volume and the second porous layer has a void fraction greater than that of the first porous layer, have higher rate performances than those of Comparative Examples 16 and 17 not satisfying these conditions.

Of Table 3, Examples 15 to 17 and Comparative Examples 18 and 19 in which the content of the first solvent is 90% by volume will be compared. Examples 15 to 17, satisfying the conditions that the first porous layer has a void fraction of from 10% by volume to 50% by volume and the second porous layer has a void fraction greater than that of the first porous layer, have higher rate performances than those of Comparative Examples 18 and 19 not satisfying these conditions.

Comparative Examples 20 to 24 in which the content of the first solvent is 100% by volume have rate performances inferior to those of Examples 6 to 17.

As is clear from the comparison between Examples 18 to 20 and Comparative Examples 25 and 26, even when the kind of the second solvent is changed, Examples 18 to 20 in which the first porous layer has a void fraction of from 10% by volume to 50% by volume and the second porous layer has a void fraction greater than that of the first porous layer have higher rate performances than those of Comparative Examples 25 and 26 in which these condition are not met.

The results of Tables 2 and 3 show that even when the content of the first solvent in the nonaqueous electrolytic solution is changed or the kind of the second solvent is changed, as long as a predetermined condition is met, a secondary battery having a low self-discharge rate and excellent in rate performance can be obtained.

Examples 21 to 29 and Comparative Examples 27 to 32

Secondary batteries were produced in the same manner as in Example 1 except that the kind of the negative electrode active material, the kind of the positive electrode active material, the kind of the first solvent, the content of the first solvent in the nonaqueous electrolytic solution, the kind of the second solvent, the position of the first porous layer, the thickness and void fraction of the first porous layer, the material forming the second porous layer, and the thickness and void fraction of the second porous layer were as shown in Table 4 below.

In Examples 21 to 23 and Comparative Examples 27 and 28, each of their secondary batteries had the second porous layer which was a polyimide fiber layer formed directly on the principal surface of the negative electrode active material-containing layer by the electrospinning method. Polyimide was dissolved in dimethylacetamid as a solvent at a concentration of 20% by mass to prepare a raw material solution. The obtained raw material solution was supplied onto the principal surface of the negative electrode active material-containing layer from a spinning nozzle at a supply rate of 5 µl/min by using a quantitative pump. Using a high voltage generator, a voltage of 20 kV was applied to the spinning nozzle, and while moving this one spinning nozzle, a polyimide fiber layer was directly formed.

For the obtained secondary batteries, the self-discharge rates and the rate performances were measured by the method described above, the results of which are shown in Table 4.

| Table 4 | Negative Electrode Active Material | Positive Electrode Active Material | First Solvent | Content of First Solvent (vol %) | Second Solvent Type | Position of First Porous Layer |
|---|---|---|---|---|---|---|
| Comparative Example 27 | $Nb_2TiO_7$ | $LiNi_{0.5}Co_{0.2}Mn_{0.3}O_2$ | EP | 33 | PC:MEC = 1:1 | Positive electrode side |
| Example 21 | $Nb_2TiO_7$ | $LiNi_{0.5}Co_{0.2}Mn_{0.3}O_2$ | EP | 33 | PC:MEC = 1:1 | Positive electrode side |
| Example 22 | $Nb_2TiO_7$ | $LiNi_{0.5}Co_{0.2}Mn_{0.3}O_2$ | EP | 33 | PC:MEC = 1:1 | Positive electrode side |
| Example 23 | $Nb_2TiO_7$ | $LiNi_{0.5}Co_{0.2}Mn_{0.3}O_2$ | EP | 33 | PC:MEC = 1:1 | Positive electrode side |
| Comparative Example 28 | $Nb_2TiO_7$ | $LiNi_{0.5}Co_{0.2}Mn_{0.3}O_2$ | EP | 33 | PC:MEC = 1:1 | Positive electrode side |
| Comparative Example 29 | $Li_4Ti_5O_{12}$ | $LiNi_{0.5}Co_{0.2}Mn_{0.3}O_2$ | EP | 33 | PC:MEC = 1:1 | Positive electrode side |
| Example 24 | $Li_4Ti_5O_{12}$ | $LiNi_{0.5}Co_{0.2}Mn_{0.3}O_2$ | EP | 33 | PC:MEC = 1:1 | Positive electrode side |
| Example 25 | $Li_4Ti_5O_{12}$ | $LiNi_{0.5}Co_{0.2}Mn_{0.3}O_2$ | EP | 33 | PC:MEC = 1:1 | Positive electrode side |
| Example 26 | $Li_4Ti_5O_{12}$ | $LiNi_{0.5}Co_{0.2}Mn_{0.3}O_2$ | EP | 33 | PC:MEC = 1:1 | Positive electrode side |
| Comparative Example 30 | $Li_4Ti_5O_{12}$ | $LiNi_{0.5}Co_{0.2}Mn_{0.3}O_2$ | EP | 33 | PC:MEC = 1:1 | Positive electrode side |
| Comparative Example 31 | $Nb_2TiO_7$ | $LiNi_{0.5}Co_{0.2}Mn_{0.3}O_2$ | EP | 33 | PC:MEC = 1:1 | Positive electrode side |
| Example 27 | $Nb_2TiO_7$ | $LiNi_{0.5}Co_{0.2}Mn_{0.3}O_2$ | EP | 33 | PC:MEC = 1:1 | Positive electrode side |
| Example 28 | $Nb_2TiO_7$ | $LiNi_{0.5}Co_{0.2}Mn_{0.3}O_2$ | EP | 33 | PC:MEC = 1:1 | Positive electrode side |
| Example 29 | $Nb_2TiO_7$ | $LiNi_{0.5}Co_{0.2}Mn_{0.3}O_2$ | EP | 33 | PC:MEC = 1:1 | Positive electrode side |
| Comparative Example 32 | $Nb_2TiO_7$ | $LiNi_{0.5}Co_{0.2}Mn_{0.3}O_2$ | EP | 33 | PC:MEC = 1:1 | Positive electrode side |

| Table 4 | Thickness of First Porous Layer (μm) | Void Fraction of First Porous Layer (vol %) | Material of Second Porous Layer | Thickness of Second Porous Layer (μm) | Void Fraction of Second Porous Layer (vol %) | Rate Performance 5 C/1 C Capacity Rate (%) | Self-Discharge Rate (%) |
|---|---|---|---|---|---|---|---|
| Comparative Example 27 | 3 | 40 | polyimide | 5 | 30 | 73 | 2 |
| Example 21 | 3 | 40 | polyimide | 5 | 50 | 81 | 2.2 |
| Example 22 | 3 | 40 | polyimide | 5 | 80 | 82 | 2.7 |
| Example 23 | 3 | 20 | polyimide | 5 | 50 | 81 | 2 |
| Comparative Example 28 | 3 | 60 | polyimide | 5 | 50 | 72 | 2.7 |
| Comparative Example 29 | 3 | 40 | cellulose | 10 | 30 | 75 | 1.9 |
| Example 24 | 3 | 40 | cellulose | 10 | 50 | 84 | 2 |
| Example 25 | 3 | 40 | cellulose | 10 | 80 | 86 | 2.6 |
| Example 26 | 3 | 20 | cellulose | 10 | 50 | 82 | 1.9 |
| Comparative Example 30 | 3 | 60 | cellulose | 10 | 50 | 76 | 2.6 |
| Comparative Example 31 | 3 | 40 | cellulose | 10 | 30 | 74 | 2.1 |
| Example 27 | 3 | 40 | cellulose | 10 | 50 | 82 | 2.3 |
| Example 28 | 3 | 40 | cellulose | 10 | 80 | 84 | 2.9 |
| Example 29 | 3 | 20 | cellulose | 10 | 50 | 83 | 2.1 |
| Comparative Example 32 | 3 | 60 | cellulose | 10 | 50 | 74 | 2.8 |

According to the comparison between Examples 21 to 23 and Comparative Examples 27 and 28 of Table 4, even when the kind of the second porous material is changed, Examples 21 to 23 in which the first porous layer and the second porous layer have appropriate void fractions have higher rate performances than those of Comparative Examples 27 and 28. According to the comparison between Examples 24 to 26 and Comparative Examples 29 and 30, even when the kind of the negative electrode active material is changed, Examples 24 to 26 have higher rate performances than those of Comparative Examples 29 and 30. Moreover, according to the comparison between Examples 27 to 29 and Comparative Examples 31 and 32, even when the composition of the positive electrode active material is changed, Examples 27 to 29 have higher rate performances than Comparative Examples 31 and 32.

Examples 30 to 38 and Comparative Examples 33 to 38

Secondary batteries were produced in the same manner as in Example 1 except that the kind of the negative electrode active material, the kind of the positive electrode active material, the kind of the first solvent, the content of the first solvent in the nonaqueous electrolytic solution, the kind of the second solvent, the position of the first porous layer, the thickness and void fraction of the first porous layer, the material forming the second porous layer, and the thickness and void fraction of the second porous layer were as shown in Table 5 below. MP of the first solvent indicates methyl propionate.

For the obtained secondary batteries, the self-discharge rates and the rate performances were measured by the method described above, the results of which are shown in Table 5.

Table 5

| Table 5 | Negative Electrode Active Material | Positive Electrode Active Material | First Solvent | Content of First Solvent (vol %) | Second Solvent Type | Position of First Porous Layer |
|---|---|---|---|---|---|---|
| Comparative Example 33 | $Nb_2TiO_7$ | $LiNi_{0.5}Co_{0.2}Mn_{0.3}O_2$ | EP | 33 | PC:MEC = 1:1 | Positive electrode side |
| Example 30 | $Nb_2TiO_7$ | $LiNi_{0.5}Co_{0.2}Mn_{0.3}O_2$ | EP | 33 | PC:MEC = 1:1 | Positive electrode side |
| Example 31 | $Nb_2TiO_7$ | $LiNi_{0.5}Co_{0.2}Mn_{0.3}O_2$ | EP | 33 | PC:MEC = 1:1 | Positive electrode side |
| Example 32 | $Nb_2TiO_7$ | $LiNi_{0.5}Co_{0.2}Mn_{0.3}O_2$ | EP | 33 | PC:MEC = 1:1 | Positive electrode side |
| Comparative Example 34 | $Nb_2TiO_7$ | $LiNi_{0.5}Co_{0.2}Mn_{0.3}O_2$ | EP | 33 | PC:MEC = 1:1 | Positive electrode side |
| Comparative Example 35 | $Nb_2TiO_7$ | $LiMn_2O_4$ | EP | 33 | PC:MEC = 1:1 | Positive electrode side |
| Example 33 | $Nb_2TiO_7$ | $LiMn_2O_4$ | EP | 33 | PC:MEC = 1:1 | Positive electrode side |
| Example 34 | $Nb_2TiO_7$ | $LiMn_2O_4$ | EP | 33 | PC:MEC = 1:1 | Positive electrode side |
| Example 35 | $Nb_2TiO_7$ | $LiMn_2O_4$ | EP | 33 | PC:MEC = 1:1 | Positive electrode side |
| Comparative Example 36 | $Nb_2TiO_7$ | $LiMn_2O_4$ | EP | 33 | PC:MEC = 1:1 | Positive electrode side |
| Comparative Example 37 | $Nb_2TiO_7$ | $LiNi_{0.5}Co_{0.2}Mn_{0.3}O_2$ | MP | 33 | PC:MEC = 1:1 | Positive electrode side |
| Example 36 | $Nb_2TiO_7$ | $LiNi_{0.5}Co_{0.2}Mn_{0.3}O_2$ | MP | 33 | PC:MEC = 1:1 | Positive electrode side |
| Example 37 | $Nb_2TiO_7$ | $LiNi_{0.5}Co_{0.2}Mn_{0.3}O_2$ | MP | 33 | PC:MEC = 1:1 | Positive electrode side |
| Example 38 | $Nb_2TiO_7$ | $LiNi_{0.5}Co_{0.2}Mn_{0.3}O_2$ | MP | 33 | PC:MEC = 1:1 | Positive electrode side |
| Comparative Example 38 | $Nb_2TiO_7$ | $LiNi_{0.5}Co_{0.2}Mn_{0.3}O_2$ | MP | 33 | PC:MEC = 1:1 | Positive electrode side |

| Table 5 | Thickness of First Porous Layer (μm) | Void Fraction of First Porous Layer (vol %) | Material of Second Porous Layer | Thickness of Second Porous Layer (μm) | Void Fraction of Second Porous Layer (vol %) | Rate Performance 5 C/1 C Capacity Rate (%) | Self-Discharge Rate (%) |
|---|---|---|---|---|---|---|---|
| Comparative Example 33 | 3 | 40 | cellulose | 10 | 30 | 71 | 2.2 |
| Example 30 | 3 | 40 | cellulose | 10 | 50 | 80 | 2.4 |
| Example 31 | 3 | 40 | cellulose | 10 | 80 | 81 | 2.9 |
| Example 32 | 3 | 20 | cellulose | 10 | 50 | 82 | 2.2 |
| Comparative Example 34 | 3 | 60 | cellulose | 10 | 50 | 73 | 2.8 |
| Comparative Example 35 | 3 | 40 | cellulose | 10 | 30 | 74 | 2 |
| Example 33 | 3 | 40 | cellulose | 10 | 50 | 83 | 2.2 |
| Example 34 | 3 | 40 | cellulose | 10 | 80 | 85 | 2.8 |
| Example 35 | 3 | 20 | cellulose | 10 | 50 | 82 | 2.1 |
| Comparative Example 36 | 3 | 60 | cellulose | 10 | 50 | 75 | 2.6 |
| Comparative Example 37 | 3 | 40 | cellulose | 10 | 30 | 73 | 2.5 |
| Example 36 | 3 | 40 | cellulose | 10 | 50 | 80 | 2.7 |
| Example 37 | 3 | 40 | cellulose | 10 | 80 | 81 | 2.9 |
| Example 38 | 3 | 20 | cellulose | 10 | 50 | 80 | 2.5 |
| Comparative Example 38 | 3 | 60 | cellulose | 10 | 50 | 70 | 3 |

In Table 5, when the kind of the positive electrode active material is changed as in Examples 30 to 35 and the other conditions other than the void fraction are the same, the examples in which the first porous layer has a void fraction of from 10% by volume to 50% by volume and the second porous layer has a void fraction greater than that of the first porous layer have higher rate performances than the comparative examples not satisfying these conditions. According to the comparison between Examples 36 to 38 and Comparative Examples 37 and 38, even when methyl propionate is used for the first solvent, Examples 36 to 38 satisfying the predetermined conditions have higher rate performances than those of Comparative Examples 37 and 38 not satisfying these conditions.

Examples 39 to 47 and Comparative Examples 39 to 44

Secondary batteries were produced in the same manner as in Example 1 except that the kind of the negative electrode active material, the kind of the positive electrode active material, the kind of the first solvent, the content of the first solvent in the nonaqueous electrolytic solution, the kind of the second solvent, the position of the first porous layer, the thickness and void fraction of the first porous layer, the material forming the second porous layer, and the thickness and void fraction of the second porous layer were as shown in Table 6 below.

For the obtained secondary batteries, the self-discharge rates and the rate performances were measured by the method described above, the results of which are shown in Table 6.

TABLE 6

| Table 6 | Negative Electrode Active Material | Positive Electrode Active Material | First Solvent | Content of First Solvent (vol %) | Second Solvent Type | Position of First Porous Layer |
|---|---|---|---|---|---|---|
| Comparative Example 39 | $Nb_2TiO_7$ | $LiNi_{0.5}Co_{0.2}Mn_{0.3}O_2$ | EP | 33 | PC:MEC = 1:1 | Negative electorde side |
| Example 39 | $Nb_2TiO_7$ | $LiNi_{0.5}Co_{0.2}Mn_{0.3}O_2$ | EP | 33 | PC:MEC = 1:1 | Negative electorde side |
| Example 40 | $Nb_2TiO_7$ | $LiNi_{0.5}Co_{0.2}Mn_{0.3}O_2$ | EP | 33 | PC:MEC = 1:1 | Negative electorde side |
| Example 41 | $Nb_2TiO_7$ | $LiNi_{0.5}Co_{0.2}Mn_{0.3}O_2$ | EP | 33 | PC:MEC = 1:1 | Negative electorde side |
| Comparative Example 40 | $Nb_2TiO_7$ | $LiNi_{0.5}Co_{0.2}Mn_{0.3}O_2$ | EP | 33 | PC:MEC = 1:1 | Negative electorde side |
| Comparative Example 41 | $Nb_2TiO_7$ | $LiNi_{0.5}Co_{0.2}Mn_{0.3}O_2$ | EP:MP = 1:1 | 33 | PC:MEC = 1:1 | Positive electrode side |
| Example 42 | $Nb_2TiO_7$ | $LiNi_{0.5}Co_{0.2}Mn_{0.3}O_2$ | EP:MP = 1:1 | 33 | PC:MEC = 1:1 | Positive electrode side |
| Example 43 | $Nb_2TiO_7$ | $LiNi_{0.5}Co_{0.2}Mn_{0.3}O_2$ | EP:MP = 1:1 | 33 | PC:MEC = 1:1 | Positive electrode side |
| Example 44 | $Nb_2TiO_7$ | $LiNi_{0.5}Co_{0.2}Mn_{0.3}O_2$ | EP:MP = 1:1 | 33 | PC:MEC = 1:1 | Positive electrode side |
| Comparative Example 42 | $Nb_2TiO_7$ | $LiNi_{0.5}Co_{0.2}Mn_{0.3}O_2$ | EP:MP = 1:1 | 33 | PC:MEC = 1:1 | Positive electrode side |
| Comparative Example 43 | $Nb_2TiO_7$ | $LiNi_{0.5}Co_{0.2}Mn_{0.3}O_2$ | EP | 33 | PC:MEC = 1:1 | Positive electrode side |
| Example 45 | $Nb_2TiO_7$ | $LiNi_{0.5}Co_{0.2}Mn_{0.3}O_2$ | EP | 33 | PC:MEC = 1:1 | Positive electrode side |
| Example 46 | $Nb_2TiO_7$ | $LiNi_{0.5}Co_{0.2}Mn_{0.3}O_2$ | EP | 33 | PC:MEC = 1:1 | Positive electrode side |
| Example 47 | $Nb_2TiO_7$ | $LiNi_{0.5}Co_{0.2}Mn_{0.3}O_2$ | EP | 33 | PC:MEC = 1:1 | Positive electrode side |
| Comparative Example 44 | $Nb_2TiO_7$ | $LiNi_{0.5}Co_{0.2}Mn_{0.3}O_2$ | EP | 33 | PC:MEC = 1:1 | Positive electrode side |

| Table 6 | Thickness of First Porous Layer (μm) | Void Fraction of First Porous Layer (vol %) | Material of Second Porous Layer | Thickness of Second Porous Layer (μm) | Void Fraction of Second Porous Layer (vol %) | Rate Performance 5 C/1 C Capacity Rate (%) | Self-Discharge Rate (%) |
|---|---|---|---|---|---|---|---|
| Comparative Example 39 | 3 | 40 | cellulose | 10 | 30 | 74 | 2.1 |
| Example 39 | 3 | 40 | cellulose | 10 | 50 | 82 | 2.3 |
| Example 40 | 3 | 40 | cellulose | 10 | 30 | 83 | 2.9 |
| Example 41 | 3 | 20 | cellulose | 10 | 50 | 81 | 2.2 |
| Comparative Example 40 | 3 | 60 | cellulose | 10 | 50 | 76 | 2.8 |
| Comparative Example 41 | 3 | 40 | cellulose | 10 | 30 | 74 | 2.2 |
| Example 42 | 3 | 40 | cellulose | 10 | 50 | 81 | 2.4 |
| Example 43 | 3 | 40 | cellulose | 10 | 80 | 82 | 2.9 |
| Example 44 | 3 | 20 | cellulose | 10 | 50 | 81 | 2.4 |
| Comparative Example 42 | 3 | 60 | cellulose | 10 | 50 | 73 | 2.9 |
| Comparative Example 43 | 1 | 40 | cellulose | 10 | 30 | 72 | 2.3 |
| Example 45 | 1 | 40 | cellulose | 10 | 50 | 80 | 2.5 |
| Example 46 | 1 | 40 | cellulose | 10 | 80 | 81 | 3 |
| Example 47 | 1 | 20 | cellulose | 10 | 50 | 80 | 2.4 |
| Comparative Example 44 | 1 | 60 | cellulose | 10 | 50 | 74 | 2.8 |

In Table 6, as is clear from the comparison between Examples 39 to 41 and Comparative Examples 39 and 40, when the second surface of the first porous layer is in contact with the negative electrode active material-containing layer, the second porous layer is in contact with the positive electrode active material-containing layer, and the other conditions other than the void fraction are the same, Examples 39 to 41 in which the first porous layer has a void fraction of from 10% by volume to 50% by volume and the second porous layer has a void fraction greater than that of the first porous layer have higher rate performances than those of Comparative Examples 39 and 40 not satisfying these conditions. According to the comparison between Examples 42 to 44 and Comparative Examples 41 and 42, even when the mixed solvent of methyl propionate and ethyl propionate is used for the first solvent, Examples 42 to 44 in which the first porous layer has a void fraction of from 10% by volume to 50% by volume and the second porous layer has a void fraction greater than that of the first porous layer have higher rate performances than those of Comparative Examples 41 and 42 not satisfying these conditions.

According to the comparison between Examples 45 to 47 and Comparative Examples 43 and 44, even when the thickness of the first porous layer is changed from Example 1 and the other conditions other than the void fraction are the same, Examples 45 to 47 in which the first porous layer has a void fraction of from 10% by volume to 50% by volume and the second porous layer has a void fraction greater than that of the first porous layer have higher rate performances than those of Comparative Examples 43 and 44 not satisfying these conditions.

Examples 48 to 56 and Comparative Examples 45 to 50

Secondary batteries were produced in the same manner as in Example 1 except that the kind of the negative electrode active material, the kind of the positive electrode active material, the kind of the first solvent, the content of the first solvent in the nonaqueous electrolytic solution, the kind of the second solvent, the position of the first porous layer, the thickness and void fraction of the first porous layer, the material forming the second porous layer, and the thickness and void fraction of the second porous layer were as shown in Table 7 below. EC indicates ethylene carbonate.

For the obtained secondary batteries, the self-discharge rates and the rate performances were measured by the method described above, the results of which are shown in Table 7.

TABLE 7

| Table 7 | Negative Electrode Active Material | Positive Electrode Active Material | First Solvent | Content of First Solvent (vol %) | Second Solvent Type | Position of First Porous Layer |
|---|---|---|---|---|---|---|
| Comparative Example 45 | $Nb_2TiO_7$ | $LiNi_{0.5}Co_{0.2}Mn_{0.3}O_2$ | EP | 33 | PC:MEC = 1:1 | Positive electrode side |
| Example 48 | $Nb_2TiO_7$ | $LiNi_{0.5}Co_{0.2}Mn_{0.3}O_2$ | EP | 33 | PC:MEC = 1:1 | Positive electrode side |
| Example 49 | $Nb_2TiO_7$ | $LiNi_{0.5}Co_{0.2}Mn_{0.3}O_2$ | EP | 33 | PC:MEC = 1:1 | Positive electrode side |
| Example 50 | $Nb_2TiO_7$ | $LiNi_{0.5}Co_{0.2}Mn_{0.3}O_2$ | EP | 33 | PC:MEC = 1:1 | Positive electrode side |
| Comparative Example 46 | $Nb_2TiO_7$ | $LiNi_{0.5}Co_{0.2}Mn_{0.3}O_2$ | EP | 33 | PC:MEC = 1:1 | Positive electrode side |
| Comparative Example 47 | $Nb_2TiO_7$ | $LiNi_{0.5}Co_{0.2}Mn_{0.3}O_2$ | EP | 33 | PC:MEC = 1:1 | Positive electrode side |
| Example 51 | $Nb_2TiO_7$ | $LiNi_{0.5}Co_{0.2}Mn_{0.3}O_2$ | EP | 33 | PC:MEC = 1:1 | Positive electrode side |
| Example 52 | $Nb_2TiO_7$ | $LiNi_{0.5}Co_{0.2}Mn_{0.3}O_2$ | EP | 33 | PC:MEC = 1:1 | Positive electrode side |
| Example 53 | $Nb_2TiO_7$ | $LiNi_{0.5}Co_{0.2}Mn_{0.3}O_2$ | EP | 33 | PC:MEC = 1:1 | Positive electrode side |
| Comparative Example 48 | $Nb_2TiO_7$ | $LiNi_{0.5}Co_{0.2}Mn_{0.3}O_2$ | EP | 33 | PC:MEC = 1:1 | Positive electrode side |
| Comparative Example 49 | $Nb_2TiO_7$ | $LiNi_{0.5}Co_{0.2}Mn_{0.3}O_2$ | EP | 33 | EC:MEC = 1:1 | Positive electrode side |
| Example 54 | $Nb_2TiO_7$ | $LiNi_{0.5}Co_{0.2}Mn_{0.3}O_2$ | EP | 33 | EC:MEC = 1:1 | Positive electrode side |
| Example 55 | $Nb_2TiO_7$ | $LiNi_{0.5}Co_{0.2}Mn_{0.3}O_2$ | EP | 33 | EC:MEC = 1:1 | Positive electrode side |
| Example 56 | $Nb_2TiO_7$ | $LiNi_{0.5}Co_{0.2}Mn_{0.3}O_2$ | EP | 33 | EC:MEC = 1:1 | Positive electrode side |
| Comparative Example 50 | $Nb_2TiO_7$ | $LiNi_{0.5}Co_{0.2}Mn_{0.3}O_2$ | EP | 33 | EC:MEC = 1:1 | Positive electrode side |

| Table 7 | Thickness of First Porous Layer (μm) | Void Fraction of First Porous Layer (vol %) | Material of Second Porous Layer | Thickness of Second Porous Layer (μm) | Void Fraction of Second Porous Layer (vol %) | Rate Performance 5 C/1 C Capacity Rate (%) | Self-Discharge Rate (%) |
|---|---|---|---|---|---|---|---|
| Comparative Example 45 | 5 | 40 | cellulose | 10 | 30 | 73 | 2 |
| Example 48 | 5 | 40 | cellulose | 10 | 50 | 81 | 2.2 |
| Example 49 | 5 | 40 | cellulose | 10 | 80 | 82 | 2.6 |
| Example 50 | 5 | 20 | cellulose | 10 | 50 | 81 | 2.3 |
| Comparative Example 46 | 5 | 60 | cellulose | 10 | 50 | 74 | 2.3 |
| Comparative Example 47 | 10 | 40 | cellulose | 10 | 30 | 70 | 2 |
| Example 51 | 10 | 40 | cellulose | 10 | 50 | 78 | 2.1 |
| Example 52 | 10 | 40 | cellulose | 10 | 80 | 80 | 2.3 |
| Example 53 | 10 | 20 | cellulose | 10 | 50 | 78 | 2.2 |
| Comparative Example 48 | 10 | 60 | cellulose | 10 | 50 | 73 | 2.2 |
| Comparative Example 49 | 3 | 40 | cellulose | 10 | 30 | 72 | 2.1 |
| Example 54 | 3 | 40 | cellulose | 10 | 50 | 50 | 2.4 |
| Example 55 | 3 | 40 | cellulose | 10 | 80 | 81 | 2.8 |
| Example 56 | 3 | 20 | cellulose | 10 | 50 | 80 | 2.2 |
| Comparative Example 50 | 3 | 60 | cellulose | 10 | 50 | 74 | 2.7 |

In Table 7, as is clear from the comparison between Examples 48 to 50 and Comparative Examples 45 and 46 and the comparison between Examples 51 to 53 and Comparative Examples 47 and 48, even when the thickness of the first porous layer is changed, the examples in which the first porous layer has a void fraction of from 10% by volume to 50% by volume and the second porous layer has a void fraction greater than that of the first porous layer have higher rate performances than the comparative examples in which these conditions are not met. According to the comparison between Examples 54 to 56 and Comparative Examples 49 and 50, even when the kind of the second solvent is changed, Examples 54 to 56 in which the first porous layer has a void fraction of from 10% by volume to 50% by volume and the second porous layer has a void fraction greater than of the first porous layer have higher rate performances than Comparative Examples 49 and 50 not satisfying these conditions.

Examples 57 to 59 and Comparative Examples 51 and 52

Secondary batteries were produced in the same manner as in Example 1 except that the kind of the negative electrode active material, the kind of the positive electrode active material, the kind of the first solvent, the content of the first solvent in the nonaqueous electrolytic solution, the kind of the second solvent, the position of the first porous layer, the thickness and void fraction of the first porous layer, the material forming the second porous layer, and the thickness and void fraction of the second porous layer were as shown in Table 8 below. DEC indicates diethyl carbonate.

For the obtained secondary batteries, the self-discharge rates and the rate performances were measured by the method described above, the results of which are shown in Table 8.

TABLE 8

| Table 8 | Negative Electrode Active Material | Positive Electrode Active Material | First Solvent | Content of First Solvent (vol %) | Second Solvent Type | Position of First Porous Layer |
|---|---|---|---|---|---|---|
| Comparative Example 51 | $Nb_2TiO_7$ | $LiNi_{0.5}Co_{0.2}Mn_{0.3}O_2$ | EP | 33 | PC:DEC = 1:1 | Positive electrode side |
| Example 57 | $Nb_2TiO_7$ | $LiNi_{0.5}Co_{0.2}Mn_{0.3}O_2$ | EP | 33 | PC:DEC = 1:1 | Positive electrode side |
| Example 58 | $Nb_2TiO_7$ | $LiNi_{0.5}Co_{0.2}Mn_{0.3}O_2$ | EP | 33 | PC:DEC = 1:1 | Positive electrode side |
| Example 59 | $Nb_2TiO_7$ | $LiNi_{0.5}Co_{0.2}Mn_{0.3}O_2$ | EP | 33 | PC:DEC = 1:1 | Positive electrode side |
| Comparative Example 52 | $Nb_2TiO_7$ | $LiNi_{0.5}Co_{0.2}Mn_{0.3}O_2$ | EP | 33 | PC:DEC = 1:1 | Positive electrode side |

| Table 8 | Thickness of First Porous Layer (μm) | Void Fraction of First Porous Layer (vol %) | Material of Second Porous Layer | Thickness of Second Porous Layer (μm) | Void Fraction of Second Porous Layer (vol %) | Rate Performance 5 C/1 C Capacity Rate (%) | Self-Discharge Rate (%) |
|---|---|---|---|---|---|---|---|
| Comparative Example 51 | 3 | 40 | cellulose | 10 | 30 | 70 | 2.1 |
| Example 57 | 3 | 40 | cellulose | 10 | 50 | 78 | 2.2 |
| Example 58 | 3 | 40 | cellulose | 10 | 80 | 80 | 2.7 |
| Example 59 | 3 | 20 | cellulose | 10 | 50 | 79 | 2.1 |
| Comparative Example 52 | 3 | 60 | cellulose | 10 | 50 | 72 | 2.7 |

In Table 8, as is clear from the comparison between Examples 57 to 59 and Comparative Examples 51 and 52, when the kind of the second solvent is changed and the other conditions other than the void fraction are the same, Examples 57 to 59 in which the first porous layer has a void fraction of from 10% by volume to 50% by volume and the second porous layer has a void fraction greater than that of the first porous layer have higher rate performances than Comparative Examples 51 and 52 not satisfying these conditions.

A secondary battery according to at least one embodiment or example described above includes a nonaqueous electrolytic solution containing a first solvent including at least one of methyl propionate and ethyl propionate, and a second solvent other than the first solvent. A first porous layer has a void fraction of from 10% by volume to 50% by volume, and a second porous layer has a void fraction greater than the void fraction of the first porous layer. Therefore, in this secondary battery, output performance can improve while self-discharge is suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery, comprising:
a positive electrode;
a negative electrode;
a separator layer comprising a first porous layer containing a solid electrolyte, and a second porous layer in contact with a first surface of the first porous layer and containing fibers, the separator layer being positioned between the positive electrode and the negative electrode, a second surface of the first porous layer parallel to the first surface being in contact with the positive electrode; and
a nonaqueous electrolytic solution comprising a first solvent including at least one of methyl propionate and ethyl propionate, and a second solvent different from the first solvent,
the first porous layer having a void fraction of 10% by volume or greater and 50% by volume or less, and the second porous layer having a void fraction greater than the void fraction of the first porous layer, the void fraction of the second porous layer being 50% by volume or greater and 80% by volume or less.

2. The secondary battery according to claim 1, wherein the first porous layer has a void fraction of 20% by volume or greater and 40% by volume or less.

3. The secondary battery according to claim 1, wherein the second surface of the first porous layer is formed directly on the positive electrode.

4. The secondary battery according to claim 3, wherein if a surface in which the second porous layer is in contact with the first surface of the first porous layer is a third surface, a fourth surface of the second porous layer parallel to the third surface is in contact with the negative electrode.

5. The secondary battery according to claim 1, wherein the second solvent comprises a cyclic carbonate.

6. The secondary battery according to claim 1, wherein the second solvent comprises a linear carbonate (excluding the first solvent).

7. The secondary battery according to claim 1, wherein a content of the first solvent in the nonaqueous electrolytic solution is 10% by volume or greater and 90% by volume or less.

8. The secondary battery according to claim 7, wherein the second solvent comprises a cyclic carbonate and a linear carbonate (excluding the first solvent).

9. The secondary battery according to claim 1, wherein the negative electrode comprises at least one of a monoclinic niobium-titanium composite oxide represented by $Li_xTi_{1-y}M1_yNb_{2-z}M2_zO_{7+\delta}$ (where M1 is at least one selected from the group consisting of Zr, Si, and Sn, M2 is at least one selected from the group consisting of V, Ta, and Bi, $0 \leq x < 5$, $0 \leq y < 1$, $0 \leq z < 2$, and $-0.3 \leq \delta \leq 0.3$) and a monoclinic niobium-titanium composite oxide represented by $Li_xTi_{1-y}M3_{y+z}Nb_{2-z}O_{7-\delta}$ (where M3 is at least one selected from the group consisting of Mg, Fe, Ni, Co, W, Ta, and Mo, $0 \leq x \leq 5.0 \leq y \leq 1$, $0 \leq z < 2$, and $-0.3 \leq \delta \leq 0.3$).

10. The secondary battery according to claim 1, wherein the first porous layer contains 80% by mass or greater and 100% by mass or less of a lithium phosphate solid electrolyte having a NASICON type structure as the solid electrolyte.

11. A battery pack comprising one or two or more of the secondary battery according to claim 1.

12. The battery pack according to claim 11, further comprising:
an external power distribution terminal; and
a protective circuit.

13. The battery pack according to claim 11, comprising two or more of the secondary battery, the secondary batteries being electrically connected in series, in parallel, or in a combination of in-series connection and in-parallel connection.

14. A vehicle installed with the battery pack according to claim 11.

15. The vehicle according to claim 14, wherein the vehicle comprises a mechanism configured to convert kinetic energy of the vehicle into regenerative energy.

16. A secondary battery, comprising:
a positive electrode;
a negative electrode;
a separator layer comprising a first porous layer containing at least one solid electrolyte selected from the group consisting of a lithium phosphate solid electrolyte having a NASICON type structure, amorphous LIPON, and LLZ having a garnet-type structure, and a second porous layer in contact with a first surface of the first porous layer and containing fibers, the separator layer being positioned between the positive electrode and the negative electrode, a second surface of the first porous layer parallel to the first surface being in contact with the positive electrode; and
a nonaqueous electrolytic solution comprising a first solvent including at least one of methyl propionate and ethyl propionate, and a second solvent different from the first solvent,
the first porous layer having a void fraction of 10% by volume or greater and 50% by volume or less, and the second porous layer having a void fraction greater than the void fraction of the first porous layer.

17. The secondary battery according to claim 16, wherein the first porous layer has a void fraction of 20% by volume or greater and 40% by volume or less.

18. The secondary battery according to claim 16, wherein the second surface of the first porous layer is formed directly on the positive electrode.

19. The secondary battery according to claim 18, wherein if a surface in which the second porous layer is in contact with the first surface of the first porous layer is a third surface, a fourth surface of the second porous layer parallel to the third surface is in contact with the negative electrode.

20. The secondary battery according to claim 16, wherein the second solvent comprises a cyclic carbonate.

21. The secondary battery according to claim 16, wherein the second solvent comprises a linear carbonate (excluding the first solvent).

22. The secondary battery according to claim 16, wherein a content of the first solvent in the nonaqueous electrolytic solution is 10% by volume or greater and 90% by volume or less.

23. The secondary battery according to claim 22, wherein the second solvent comprises a cyclic carbonate and a linear carbonate (excluding the first solvent).

24. The secondary battery according to claim 16, wherein the negative electrode comprises at least one of a monoclinic niobium-titanium composite oxide represented by $Li_xTi_{1-y}M1_yNb_{2-z}M2_zO_{7+\delta}$ (where M1 is at least one selected from the group consisting of Zr, Si, and Sn, M2 is at least one selected from the group consisting of V, Ta, and Bi, $0 \leq x \leq 5$, $0 \leq y < 1$, $0 \leq z < 2$, and $-0.3 \leq \delta \leq 0.3$) and a monoclinic niobium-titanium composite oxide represented by $Li_xTi_{1-y}M3_{y+z}Nb_{2-z}O_7-\delta$(where M3 is at least one selected from the group consisting of Mg, Fe, Ni, Co, W, Ta, and Mo, $0 \leq x \leq 5$, $0 \leq y < 1$, $0 \leq z < 2$, and $-0.3 \leq \delta \leq 0.3$).

25. The secondary battery according to claim 16, wherein the first porous layer contains 80% by mass or greater and 100% by mass or less of the lithium phosphate solid electrolyte having the NASICON type structure as the solid electrolyte.

26. A battery pack comprising one or two or more of the secondary battery according to claim 16.

27. The battery pack according to claim 26, further comprising:
an external power distribution terminal; and
a protective circuit.

28. The battery pack according to claim 26, comprising two or more of the secondary battery, the secondary batteries being electrically connected in series, in parallel, or in a combination of in-series connection and in-parallel connection.

29. A vehicle installed with the battery pack according to claim 26.

30. The vehicle according to claim 29, wherein the vehicle comprises a mechanism configured to convert kinetic energy of the vehicle into regenerative energy.

* * * * *